United States Patent
Eto

(10) Patent No.: US 9,202,508 B2
(45) Date of Patent: Dec. 1, 2015

(54) OPTICAL DISK DRIVE CONFIGURED TO INCLINE A CHUCK PULLEY RELATIVE TO A TURNTABLE

(71) Applicant: Sony Computer Entertainment Inc., Tokyo (JP)

(72) Inventor: Kazutaka Eto, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/324,814

(22) Filed: Jul. 7, 2014

(65) Prior Publication Data
US 2015/0026704 A1    Jan. 22, 2015

(30) Foreign Application Priority Data

Jul. 17, 2013   (JP) .................................. 2013-148887

(51) Int. Cl.
*G11B 17/028* (2006.01)
*G11B 17/04* (2006.01)
*G11B 17/051* (2006.01)

(52) U.S. Cl.
CPC ........ *G11B 17/0288* (2013.01); *G11B 17/0404* (2013.01); *G11B 17/0515* (2013.01)

(58) Field of Classification Search
CPC ........... G11B 17/0286; G11B 17/0285; G11B 17/0284; G11B 17/0288
USPC .......................... 720/604, 605, 706, 710–714
See application file for complete search history.

(56) References Cited

U.S. PATENT DOCUMENTS

| 7,669,211 | B2 | 2/2010 | Chen | |
| 7,757,246 | B2 * | 7/2010 | Okazaki et al. | 720/710 |
| 8,056,097 | B2 | 11/2011 | Suzuki | |
| 8,327,393 | B2 * | 12/2012 | Ogawa | 720/706 |
| 2005/0050561 | A1 * | 3/2005 | Hirano et al. | 720/619 |
| 2005/0050570 | A1 * | 3/2005 | Abe | 720/703 |
| 2007/0083881 | A1 * | 4/2007 | Yeh et al. | 720/706 |

(Continued)

FOREIGN PATENT DOCUMENTS

| JP | 08167206 A | 6/1996 |
| JP | 2002334495 A | 11/2002 |

(Continued)

OTHER PUBLICATIONS

Office Action for corresponidng JP Application No. 2013-148887, dated Apr. 21, 2015.

*Primary Examiner* — Adam B Dravininkas
(74) *Attorney, Agent, or Firm* — Matthew B. Dernier, Esq.

(57) ABSTRACT

Provided is an optical disk drive including a turntable on which an optical disk is mounted and which rotates the optical disk, a chuck pulley movable in the direction of an axis of the turntable between a first pulley position spaced from the turntable and a second pulley position which is close to the turntable and in which the chuck pulley grips the optical disk together with the turntable, the chuck pulley being attracted toward the turntable by a magnetic force, and a pulley operating mechanism for moving the chuck pulley between the first pulley position and the second pulley position. The pulley operating mechanism, at the time of moving the chuck pulley between the first pulley position and the second pulley position, inclines the chuck pulley in relation to the turntable, and brings the chuck pulley closer to or away from the turntable.

8 Claims, 19 Drawing Sheets

(56) References Cited

U.S. PATENT DOCUMENTS

| | | |
|---|---|---|
| 2009/0228907 A1 | 9/2009 | Suzuki |
| 2011/0239233 A1 | 9/2011 | Yoguchi |
| 2011/0321069 A1* | 12/2011 | Ogawa .................. 720/706 |
| 2012/0036521 A1* | 2/2012 | Tsai et al. ............... 720/710 |

FOREIGN PATENT DOCUMENTS

| | | |
|---|---|---|
| JP | 2003272270 A | 9/2003 |
| JP | 2005044445 A | 2/2005 |
| JP | 2009211767 A | 9/2009 |
| JP | 2011044189 A | 3/2011 |

\* cited by examiner

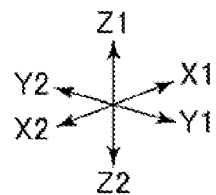
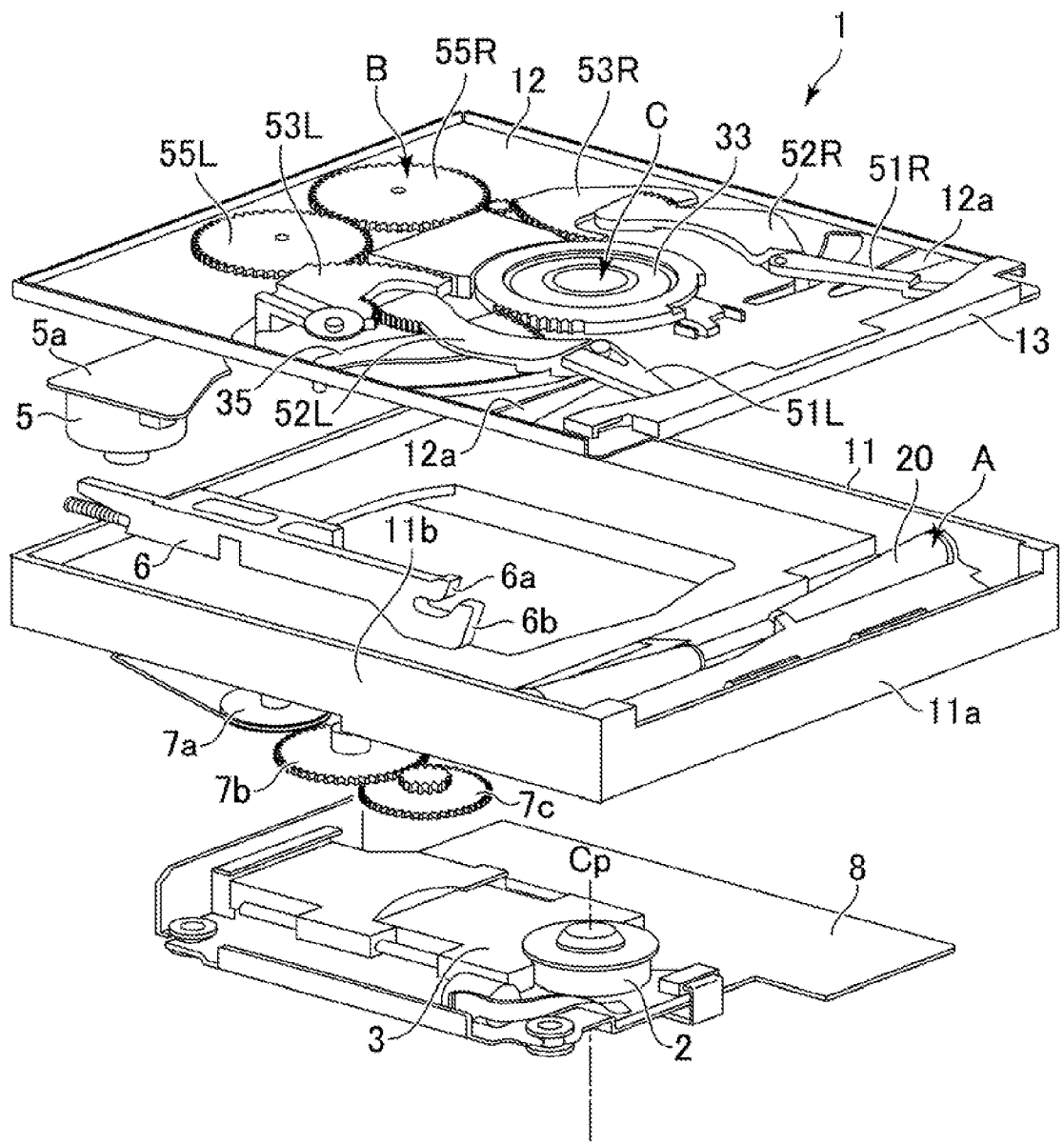
FIG.1

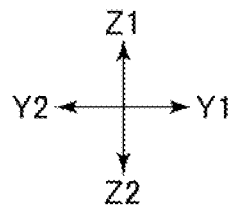
FIG.5A
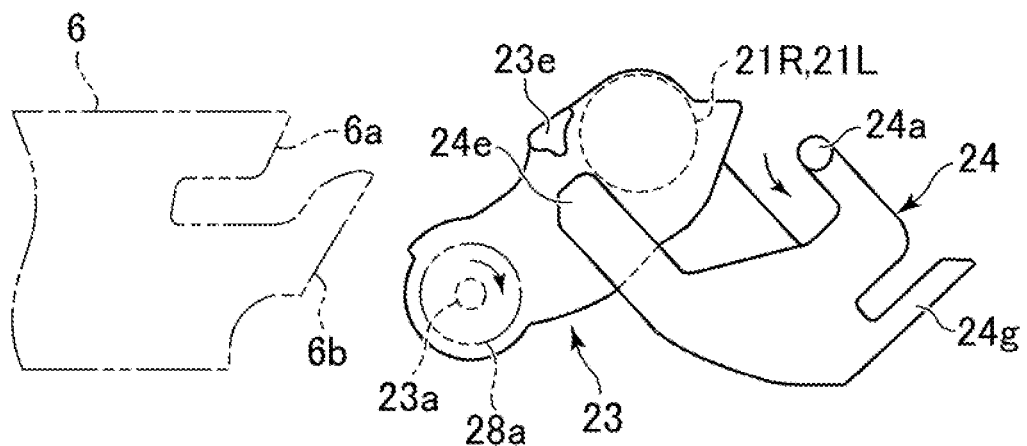
FIG.5B
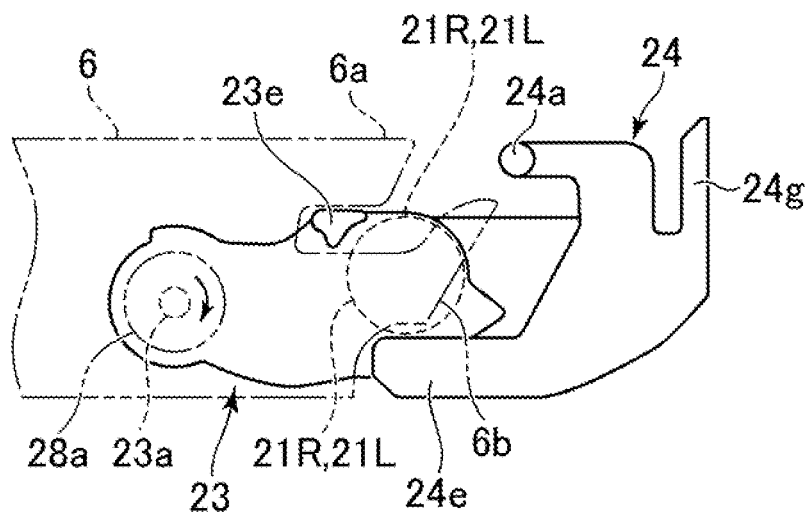

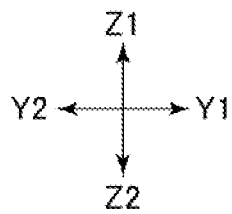
FIG. 6A
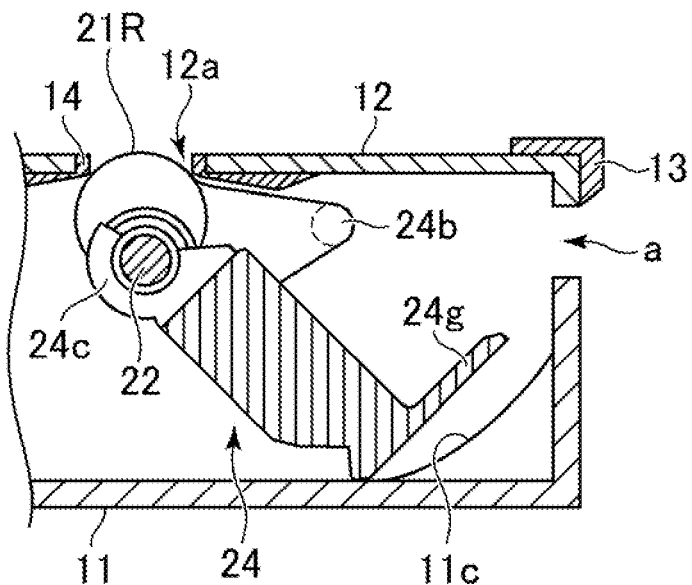
FIG. 6B
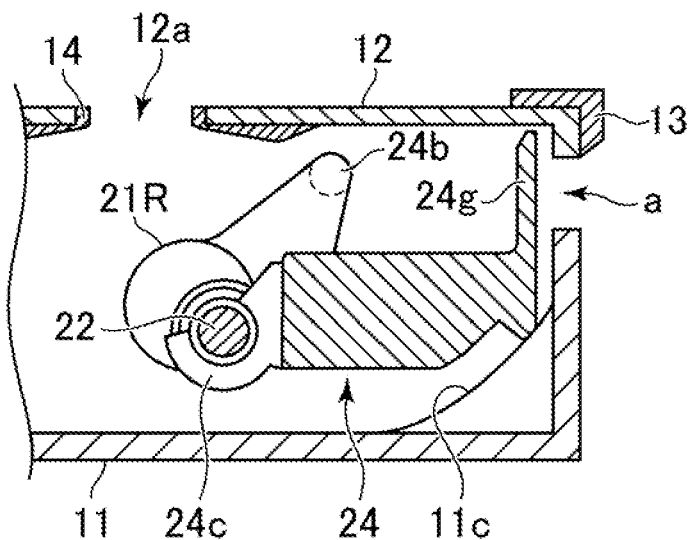

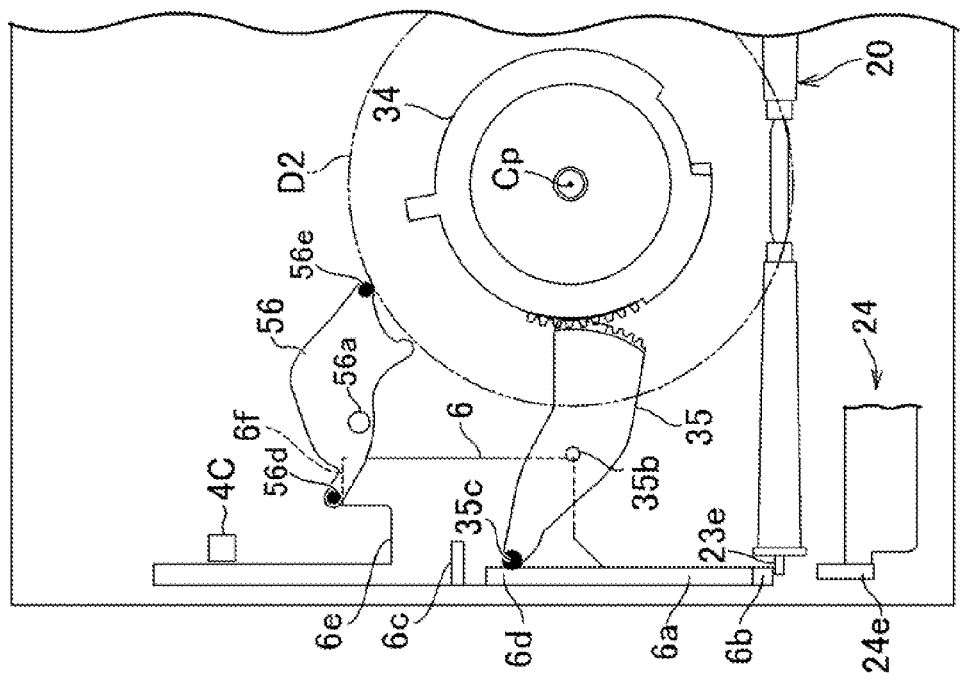
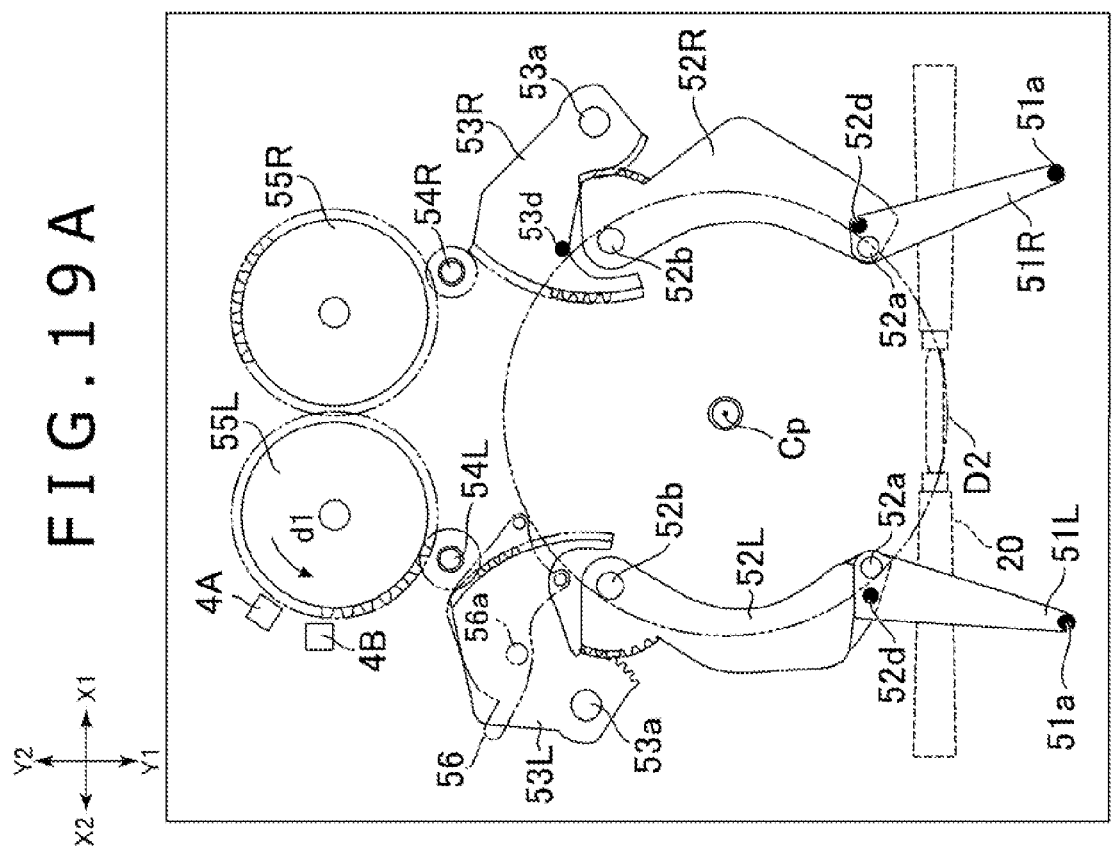

OPTICAL DISK DRIVE CONFIGURED TO INCLINE A CHUCK PULLEY RELATIVE TO A TURNTABLE

BACKGROUND

The present invention relates to a chucking mechanism in an optical disk drive.

Hitherto, optical disk drives have been utilized for reading data recorded on optical disks and writing data onto optical disks (refer to, for example, U.S. Patent Application Publication No. 2011/0239233). An optical disk drive has a turntable for rotating an optical disk. Among the optical disk drives, there are those having a chuck pulley which is so supported as to be movable in the direction of the axis of the turntable and which is being attracted toward the turntable by a magnetic force. The optical disk is gripped by the chuck pulley and the turntable, and is rotated together with the turntable.

SUMMARY

When the chuck pulley is attracted onto the turntable by a magnetic force, a sound due to impact between the chuck pulley and the turntable may be generated. In addition, if the force required for separating the chuck pulley from the turntable can be reduced without weakening the magnetic force, miniaturization of the mechanism for supporting the chuck pulley can be promised.

Thus, there is a need for an optical disk drive which makes it possible to suppress the generation of a sound at the time of magnetic attraction of a chuck pulley onto a turntable and/or to reduce the force required for separating the chuck pulley from the turntable.

According to an embodiment of the present disclosure, there is provided an optical disk drive including a turntable on which an optical disk is mounted and which rotates the optical disk, a chuck pulley configured to be movable in the direction of an axis of the turntable between a first pulley position spaced from the turntable and a second pulley position which is close to the turntable and in which the chuck pulley grips the optical disk together with the turntable, the chuck pulley being attracted toward the turntable by a magnetic force, and a pulley operating mechanism configured to move the chuck pulley between the first pulley position and the second pulley position. In this optical disk drive, the pulley operating mechanism, at the time of moving the chuck pulley between the first pulley position and the second pulley position, inclines the chuck pulley in relation to the turntable, and brings the chuck pulley closer to or away from the turntable. According to the present disclosure, it is possible to suppress the generation of a sound at the time of magnetic attraction of the chuck pulley onto the turntable and to reduce the force required for separating the chuck pulley from the turntable.

BRIEF DESCRIPTION OF THE DRAWINGS

FIG. 1 is an exploded perspective view of an optical disk drive according to an embodiment of the present disclosure;

FIGS. 5A and 5B are side views (as viewed along arrow V in FIG. 2) of the carrying mechanism, wherein FIG. 5A shows the state where the carrying roller is disposed in a carrying position, and FIG. 5B shows the state where the carrying roller is disposed in a retracted position;

FIGS. 6A and 6B are sectional views taken along line VI-VI of FIG. 2, wherein FIG. 6A shows the state where the carrying roller is disposed in the carrying position, and FIG. 6B shows the state where the carrying roller is disposed in the retracted position;

FIGS. 19A and 19B are views showing motions of the centering mechanism, the carrying mechanism and the chucking mechanism.

DETAILED DESCRIPTION OF THE PREFERRED EMBODIMENT

Figure 2:
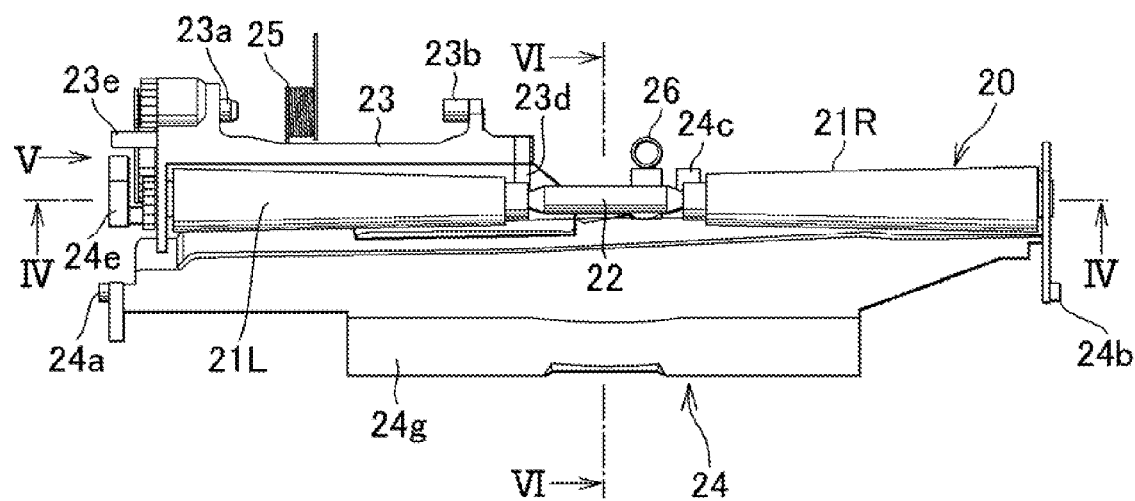
FIG. 2 is a plan view of a carrying mechanism.

Now, one embodiment of the present disclosure will be described below referring to the drawings. FIG. 1 is an exploded perspective view of an optical disk drive 1 according to an embodiment of the present disclosure. In the following description, directions X1 and X2 indicated in FIG. 1 will be a rightward direction and a leftward direction, while directions Y1 and Y2 will be a forward direction and a rearward direction, and directions Z1 and Z2 will be an upward direction and a downward direction.

The optical disk drive 1 includes an optical unit 3. The optical unit 3 has a turntable 2 on which an optical disk is mounted and by which the optical disk is rotated. In addition, the optical unit 3 includes a circuit board 8 with the turntable 2 mounted thereon, an optical pick-up, a motor which moves the optical pick-up forward and rearward, and so on. The optical disk drive 1 has a base frame 11. The optical unit 3 is mounted on the lower side of the base frame 11.

The base frame 11 is roughly box-like in overall shape, and a carrying mechanism A including a carrying roller 20 is disposed inside the base frame 11. The carrying roller 20 carries an optical disk, inserted in an insertion port of the optical disk drive 1, to a drive position, and carries the optical disk from the drive position to the outside of the insertion port. Here, the drive position means a position where reading/writing of data on the optical disk is conducted. In other words, the drive position is the position of the optical disk at the time when the center of the optical disk is on the axis Cp (center of rotation) of the turntable 2. The optical disk is, for example, a CD (Compact Disc), a DVD (Digital Versatile Disc), a Blu-ray Disc (registered trademark), or the like. The optical disk drive 1 described as an example here is compatible with both optical disks having a diameter of 12 cm and optical disks having a diameter of 8 cm. The present disclosure is also applicable to an optical disk drive which is compatible with only one of the two types of optical disks differing in size.

The optical disk drive 1 has a plate-shaped top frame 12 mounted on the upper side of the base frame 11. The base frame 11 is provided with a recess at an upper edge of a front wall portion 11a thereof. The recess and the top frame 12 define the insertion port for inserting an optical disk therethrough. The optical disk inserted is disposed between the base frame 11 and the top frame 12. In the example shown in FIG. 1, a guide member 13 covering an upper edge of the insertion port (a front edge of the top frame 12) and guiding the optical disk to the insertion port is attached to the top frame 12.

A centering mechanism B and a chucking mechanism C are disposed on the top frame 12. The centering mechanism B is a mechanism for positioning an optical disk so that the center of the optical disk inserted agrees with the axis Cp of the turntable 2. The chucking mechanism C is a mechanism for fixing the optical disk onto the turntable 2. The chucking mechanism C includes a chuck pulley 33 which is magnetically attracted to the turntable 2. The optical disk is gripped by and between the chuck pulley 33 and the turntable 2. The carrying mechanism A, the chucking mechanism C and the centering mechanism B will be described in detail later.

The optical disk drive 1 includes a motor 5, and a substrate 5a to which the motor 5 is mounted. These are disposed inside the base frame 11, and are covered with the top frame 12. The carrying mechanism A and the chucking mechanism C are operated by power received from the motor 5. The optical disk drive 1 in the example described here has a slider 6 disposed inside the base frame 11, as shown in FIG. 1. The slider 6 slides in the front-rear direction under a force supplied from the motor 5 through gears 7a, 7b and 7c, to move the carrying mechanism A and the chucking mechanism C.

Figure 3:
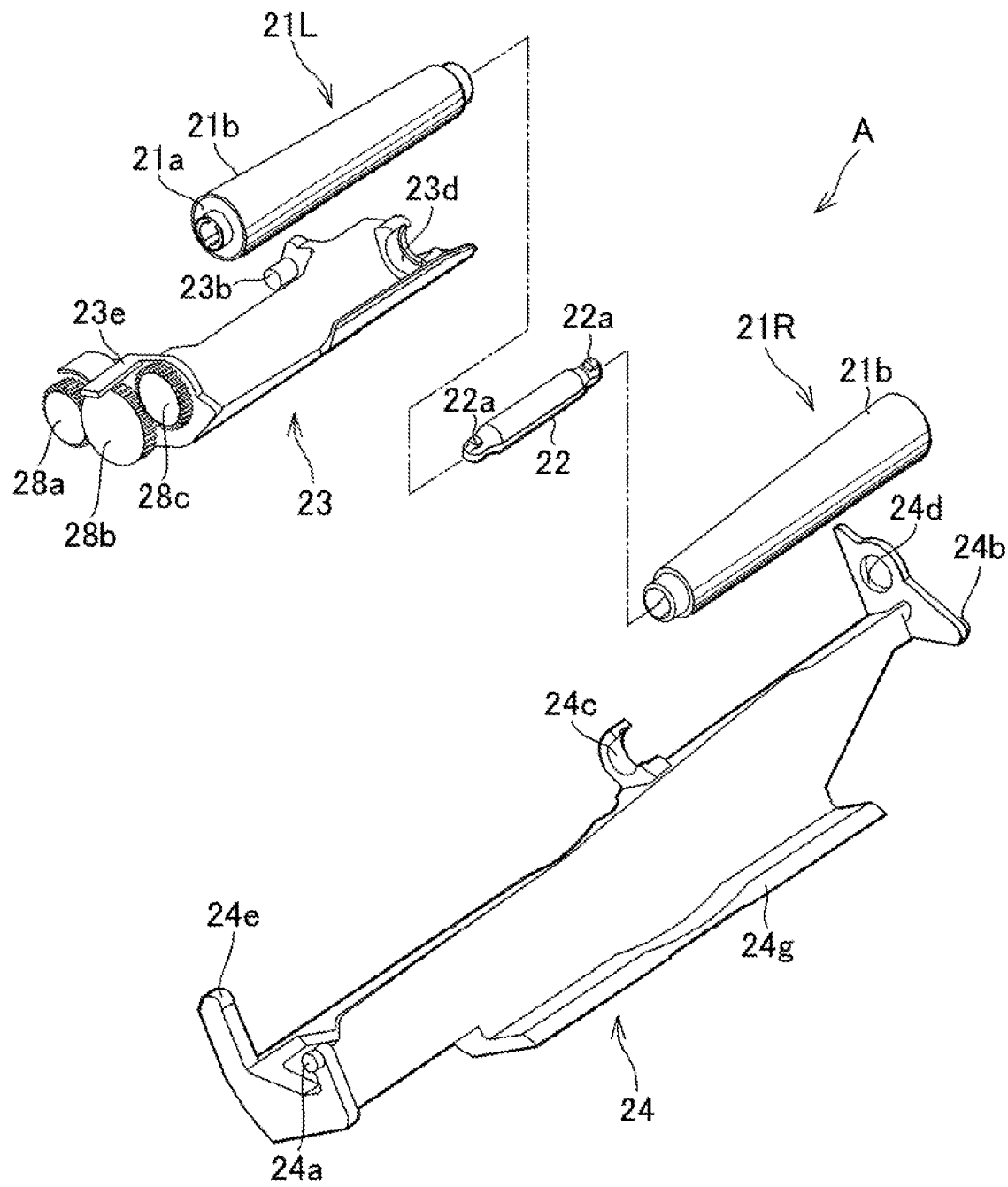
FIG. 3 is an exploded perspective view of the carrying mechanism.
Figure 4:
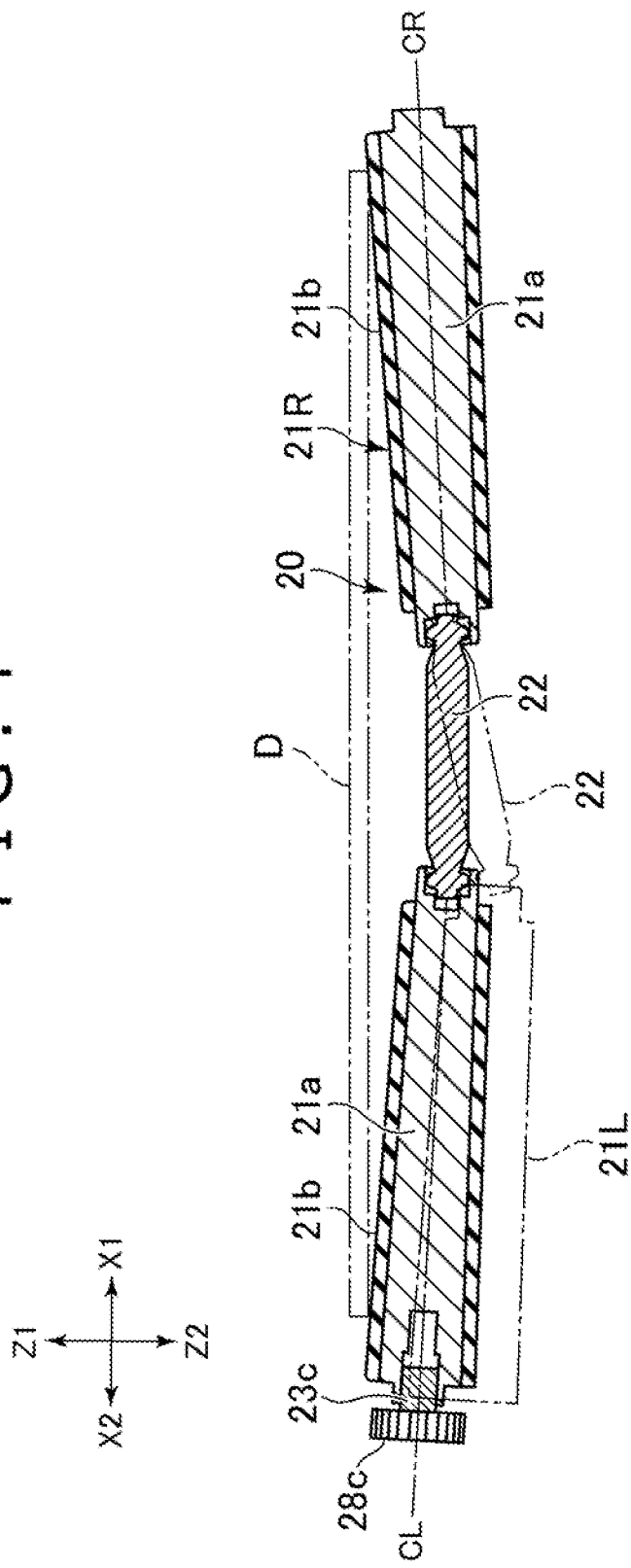
FIG. 4 is a sectional view of a carrying roller taken along line IV-IV of FIG. 2.

First, the carrying mechanism A will be described. FIG. 2 is a plan view of the carrying mechanism A. FIG. 3 is an exploded perspective view of the carrying mechanism A. FIG. 4 is a sectional view of the carrying roller 20, taken along line IV-IV of FIG. 2. FIGS. 5A and 5B are side views of the carrying mechanism A (as viewed along arrow V in FIG. 2). FIGS. 6A and 6B are sectional views taken along line VI-VI of FIG. 2.

The carrying mechanism A is disposed along the front wall portion 11a of the base frame 11, and is located at a frontmost portion of the optical disk drive 1 (see FIG. 1). The carrying roller 20 is so disposed as to make contact with an optical disk inserted in an insertion port a (see FIGS. 6A and 6B) of the optical disk drive 1. In the example described here, the carrying roller 20 is disposed along the left-right direction, and is located below a carrying path through which the optical disk passes. The carrying roller 20 makes contact with a lower surface of the optical disk, and carries the optical disk in the front-rear direction.

As shown in FIG. 2, the carrying roller 20 has a left roller 21L and a right roller 21R, which are aligned in the left-right direction. Each of the rollers 21L and 21R makes contact with the lower surface of the optical disk. The rollers 21L and 21R are biased toward the optical disk carrying path (here, upward) by springs 25 and 26, respectively. In other words, the rollers 21L and 21R are biased toward carrying positions. The carrying positions are the positions of the rollers 21L and 21R as shown in FIG. 5A and FIG. 6A. When in the carrying positions, the rollers 21L and 21R make contact with an optical disk, and can carry the optical disk. As will be detailed later, each of the rollers 21L and 21R can move between the carrying position and a retracted position which is spaced from the carrying position in a direction (here, downward) for coming away from the optical disk carrying path. The retracted positions are the positions of the rollers 21L and 21R as shown in FIG. 5B and FIG. 6B. When the rollers 21L and 21R are in the retracted positions, the whole body of the rollers 21L and 21R is spaced downward from the optical disk carrying path.

The rollers 21L and 21R are pressed against the lower surface of the optical disk by elastic forces of the springs 25 and 26 (see FIG. 2). The carrying roller 20 is covered with the top frame 12. As shown in FIG. 1, the top frame 12 is provided with openings 12a at two positions corresponding to the rollers 21L and 21R, respectively. Outside portions in the left-right direction of the rollers 21L and 21R are fitted in the openings 12a. This ensures that gaps between the rollers 21L and 21R and the top frame 12 can be reduced, and stability of contact between the rollers 21L and 21R and the top frame 12 can be secured. To the lower side of an edge of each of the opening 12a is attached a guide member 14 (see FIGS. 6A and 6B) for permitting smooth movement of the optical disk. The guide member 14 is formed of resin. The optical disk is carried along the guide members 14.

As shown in FIG. 4, the axis CL of the left roller 21L and the axis CR of the right roller 21R are inclined in relation to the optical disk D. Specifically, the axis CL of the left roller 21L and the axis CR of the right roller 21R are inclined with reference to a plane which is parallel to both the front-rear direction and the left-right direction and which contains the optical disk carrying path. The axis CL of the left roller 21L is so inclined that the distance between the axis CL and the optical disk D (in other words, the distance between the axis CL and the above-mentioned plane) gradually increases from a left end portion of the carrying roller 20 toward a central portion of the carrying roller 20. Similarly, the axis CR of the right roller 21R is so inclined that the distance between the axis CR and the optical disk D (in other words, the distance between the axis CR and the above-mentioned plane) gradually increases from a right end portion of the carrying roller 20 toward a central portion of the carrying roller 20. This layout of the rollers 21L and 21R ensures that the width in the left-right direction of the areas of contact between the rollers 21L and 21R and the optical disk D can be reduced. As a result, the rollers 21L and 21R can be restrained from making contact with that part of the optical disk D on which data is recorded.

As shown in FIG. 4, each of the rollers 21L and 21R has a cylindrical core portion 21a and a cushion portion 21b which is formed on an outer peripheral surface of the core portion 21a. The cushion portion 21b is formed from an elastic material. The material of the cushion member 21b is, for example, a thermoplastic elastomer. The core portion 21a is higher than the cushion portion 21b in rigidity.

Preferably, the cushion portion 21b and the core portion 21a are formed by two-color molding (double molding). In the two-color molding, first, the core portion 21a is molded by use of a mold corresponding to the shape of the core portion 21a. Thereafter, the core portion 21a is placed in another mold, and the cushion portion 21b is molded on the outer peripheral surface of the core portion 21a. Such a method ensures that the cushion portion 21b can be made thinner than that in a structure wherein a tubular cushion portion 21b is fitted over a core portion 21a. Consequently, the width in the left-right direction of the areas of contact between the rollers 21L and 21R and the optical disk D can be further reduced.

In the example shown in FIG. 4, the thickness of the cushion portion 21b is generally uniform from an end portion on one side toward an end portion on the other side of each of the rollers 21L and 21R. As a result, the width in the left-right direction of the areas of contact between the rollers 21L and 21R and the optical disk D can be restrained from varying during a carrying process. Specifically, the positions of contact between the rollers 21L and 21R and the optical disk D move from the outer sides toward a central portion, or from the central portion toward the outer sides, in the left-right direction of the two rollers 21L and 21R during the carrying process of the optical disk D. With the thickness of the cushion portion 21b made uniform, it is ensured that the width of the areas of contact between the rollers 21L and 21R and the optical disk D can be restrained from varying during the moving process of the positions of contact.

Incidentally, the diameter of the core portion 21a is, for example, constant from an end portion on one side toward an end portion on the other side, of the core portion 21a. Or, the diameter of the core portion 21a may gradually decreases from an end portion on one side toward an end portion on the other side, of the core portion 21a, in such a manner that the outer peripheral surface of the core portion 21a is tapered. Such a configuration permits easier molding of the core portion 21a. In addition, it is preferable for the diameter of the core portion 21a to be set greater. Such a setting ensures that the width in the front-rear direction of the areas of contact between the rollers 21L and 21R and the optical disk D can be increased. Consequently, fatigue of the cushion portion 21b due to friction between the cushion portion 21b and the optical disk D can be reduced.

The left roller 21L and the right roller 21R are so supported that they can move up and down independently from each other. In FIG. 4, the left roller 21L that has been moved downward independently of the right roller 21R is depicted in two-dot chain lines. With the rollers 21L and 21R supported in this way, the contact between the rollers 21L and 21R and the optical disk D can be maintained, even in the case where the position of the optical disk D is erroneously shifted in the left-right direction when the user inserts the optical disk D.

The carrying mechanism A in the example described here includes a left roller bracket 23 and a right roller bracket 24 (see FIG. 3). The rollers 21L and 21R are supported by the roller brackets 23 and 24, respectively. The left roller bracket 23 can be moved upward and downward about a shaft portion provided at a position spaced in the front-rear direction from the axis CL of the roller 21L. The right roller bracket 24 can be moved upward and downward about a shaft portion which is provided at a position spaced in the front-rear direction from the axis CR of the roller 21R and which is different from the shaft portion supporting the left roller bracket 23. This ensures that the left roller 21L and the right roller 21R can be moved up and down independently from each other.

In the example described here, as shown in FIG. 2, the left roller bracket 23 includes shaft portions 23a and 23b which are located at positions spaced from each other in the left-right direction, and a support portion 23d which is spaced from the shaft portions 23a and 23b in a radial direction of the latter. The shaft portions 23a and 23b are rotatably supported by the base frame 11. The support portion 23d is arcuate in shape, and an end portion of the left roller 21L is fitted in the inside of the support portion 23d. Besides, as shown in FIG. 4, a support portion 23c is formed to be integral with a gear 28c, which will be described later. The support portion 23c is fitted in a hole formed in an end portion on one side (left end portion) of the left roller 21L. The support portions 23c and 23d support the left roller 21L in a rotatable manner. The left roller bracket 23 can be rotated about the shaft portions 23a and 23b so that the support portions 23c and 23d are moved up and down. Like the left roller bracket 23, the right roller bracket 24 includes shaft portions 24a and 24b, and support portions 24c and 24d. The shaft portions 24a and 24b are rotatably supported by the base frame 11. More specifically, the shaft portions 24a and 24b are supported by a side wall portion 11b of the base frame 11. The support portions 24c and 24d support the right roller 21R in a rotatable manner. The right roller bracket 24 can be rotated about the shaft portions 24a and 24b so that the support portions 24c and 24d are moved up and down. This ensures that the left roller 21L and the right roller 21R can be moved up and down independently from each other.

As shown in FIGS. 5A and 5B, in the example described here, the shaft portions 23a and 23b of the left roller bracket 23 are each located rearwardly and downwardly of the left roller 21L. As a result, the left roller bracket 23 is rotated clockwise with the shaft portions 23a and 23b as a center, and the left roller 21L is moved downward toward the retracted position. On the other hand, the shaft portions 24a and 24b of the right roller bracket 24 are located forwardly of the right roller 21R. The shaft portions 24a and 24b are supported by the side wall portion 11b of the base frame 11. The right roller bracket 24 is rotated counterclockwise with the shaft portions 24a and 24b as a center. This results in that the right roller 21R is moved downward toward the retracted position.

The roller brackets 23 and 24 support the rollers 21L and 21R in such a manner that the axes CL and CR of the rollers 21L and 21R are inclined in relation to the optical disk D. Specifically, a straight line passing through the centers of the support portions 23c and 23d is inclined relative to the axes of the shaft portions 23a and 23b, whereby the axis CL of the left roller 21L is inclined in relation to the optical disk D as above-mentioned. Similarly, a straight line passing through the centers of the support portions 24c and 24d are inclined relative to the axes of the shaft portions 24a and 24b, whereby the axis CR of the right roller 21R is inclined in relation to the optical disk D.

As shown in FIG. 2, the spring 25 is mounted to the left roller bracket 23. The spring 26 is mounted to the right roller bracket 24. The springs 25 and 26 respectively bias the roller brackets 23 and 24 upward so that the rollers 21L and 21R are located in the carrying positions. In the example described here, the spring 25 is a helical torsion spring, and is pressing the left roller bracket 23 upward. In other words, the spring 25 biases the left roller bracket 23 so as to rotate the left roller bracket 23 counterclockwise, with the shaft portions 23a and 23b as a center. As a result, the left roller 21L is biased upward. The spring 26 is a tension spring, and is pulling a lower portion of the right roller bracket 24 rearward. In other words, the spring 26 biases the right roller bracket 24 so as to rotate the right roller bracket 24 clockwise, with the shaft portions 24a and 24b as a center. Consequently, the right roller 21R is biased upward.

The two roller brackets 23 and 24 rotate with the shaft portions 23a and 23b, and 24a and 24b as centers under power supplied from the motor 5. In this embodiment, the route of transmission of a force from the motor 5 to the left roller bracket 23 and the route of transmission of a force from the motor 5 to the right roller bracket 24 are the same. In other words, the two roller brackets 23 and 24 are pushed by a common movable member which moves under power of the motor 5. As a result, the roller brackets 23 and 24 are rotated with the shaft portions 23a and 23b, and 24a and 24b as centers, and the rollers 21L and 21R are moved from the carrying positions to the retracted positions. With the common movable member thus utilized, a reduction in the number of component parts can be promised. The optical disk drive 1 in the example described here is provided, as the common movable member, with the slider 6 which slides in the front-rear direction under power of the motor 5 (see FIG. 1 and FIGS. 5A and 5B). The slider 6 is disposed on the right side or the left side (in the example described here, on the left side) of the carrying mechanism A. With the slider 6 disposed on one of the right side and the left side of the carrying mechanism A, interference between the slider 6 and the optical unit 3 can be avoided. A mechanism for moving the slider 6 will be described in detail later.

As shown in FIG. 3, the roller brackets 23 and 24 respectively have pressed portions 23e and 24e. In the example described here, the pressed portions 23e and 24e are provided on the left side in the carrying mechanism A. Both the pressed portions 23e and 24e are located on a moving course of the slider 6 (see FIGS. 5A and 5B). The pressed portion 23e is protruding leftward from the left roller bracket 23. The right roller bracket 24 extends leftward from the positions where the support portions 24c and 24d are formed, while passing on the front side of the left roller bracket 23. The pressed portion 24e is provided at a leftmost portion of the right roller bracket 24.

As shown in FIGS. 5A and 5B, the slider 6 is provided at its front portion with a left roller operating portion 6a for pressing the pressed portion 23e and with a right roller operating portion 6b for pressing the pressed portion 24e. In the example described here, the two roller operating portions 6a and 6b are aligned in the vertical direction. When an optical disk is disposed in a drive position, the slider 6 moves forward to press the pressed portions 23e and 24e (see FIG. 5B). In the left roller bracket 23, the pressed portion 23e and the left roller 21L are located on the front side and the upper side of the shaft portions 23a and 24b. When the pressed portion 23e is pushed forward by the left roller operating portion 6a, the left roller 21L is moved down with the shaft portions 23a and 23b as a center, to be disposed in a retracted position. In the right roller bracket 24, the pressed portion 24e and the right roller 21R are located on the rear side of the shaft portions 24a and 24b. The right roller operating portion 6b is formed with a slant surface at the front end thereof, and the pressed portion 24e is pushed forward and downward by the right roller operating portion 6b. This results in that the right roller bracket 24 is rotated in the reverse direction as compared with the left roller bracket 23. Besides, the right roller 21R is moved down with the shaft portions 24a and 24b as a center, to be disposed in a retracted position. When the rollers 21L and 21R are disposed in the retracted positions, namely, when the slider 6 is moved forward by a preset distance, the pressed portions 23e and 24e are disposed on the lower side of the roller operating portions 6a and 6b, respectively (see FIG. 5B).

As shown in FIG. 3, the carrying roller 20 has a coupling shaft 22 which is disposed between the rollers 21L and 21R so as to transmit a rotational force of one of the rollers to the other of the rollers. With the coupling shaft 22 utilized, it is possible to reduce the number of component parts of a mechanism for transmission of a rotational force from the motor 5 to the carrying roller 20. In the example described here, a plurality of gears (in this example, three gears) 28a to 28c for transmitting the rotational force of the motor 5 to the left roller 21L are supported by the left roller bracket 23. The rotational force is transmitted from the left roller 21L to the right roller 21R via the coupling shaft 22. Such gears are provided only on the left roller bracket 23, and are not provided on the right roller bracket 24.

As shown in FIG. 4, the rollers 21L and 21R are formed with holes in their end portions, and end portions of the coupling shaft 22 are fitted in these holes. The coupling shaft 22 is formed at end portions thereof with projections 22a which project in a radial direction of the coupling shaft 22 (see FIG. 3). On the other hand, the holes formed in the end portions of the rollers 21L and 21R are formed in their inside surfaces with grooves in which the projections 22a are fitted and which extend in the left-right direction. This ensures that the coupling shaft 22 and the rollers 21L and 21R are restrained from relative rotation but that the two rollers 21L and 21R are permitted to perform mutually independent vertical movements. Specifically, with the projections 22a moved along the grooves, the coupling shaft 22 can be inclined relative to the two rollers 21L and 21R, as indicated by two-dot chain lines in FIG. 4. The two rollers 21L and 21R can thus move up and down in an independent manner, and they are being biased toward the carrying positions by the springs 25 and 26 as above-mentioned. This ensures that the contact between the two rollers 21L and 21R and an outer peripheral edge of an optical disk can be maintained during a carrying process of the optical disk, even in the case where the position of the optical disk at the time of insertion thereof is erroneously shifted rightward or leftward in relation to the insertion port a, the case where the optical disk is not truly circular in shape, the case where an optical disk with a diameter of 8 cm is inserted, or the like case.

As has been described above, the three gears 28a to 28c are supported by the left roller bracket 23. As shown in FIG. 3, the gears 28a and 28c are disposed on the left side of the left roller bracket 23. The rotational force of the motor 5 is inputted to the first gear 28a through the gear 7c (see FIG. 1). The first gear 28a is located rearwardly of and downwardly of the left roller 21L. The center of rotation of the first gear 28a agrees with the axis of the shaft portions 23a and 23b of the left roller bracket 23. Therefore, the position of the first gear 28a remains unchanged even where the left roller bracket 23 is rotated with the shaft portions 23a and 23b as a center. As a result, the engagement between the first gear 28a and the gear 7c is maintained. In addition, the motor 5 is disposed on a rear-side portion of the base frame 11. With the first gear 28a disposed on the rear side and the lower side of the left roller 21L, the distance between the motor 5 and the first gear 28a is reduced. As a result, the layout of the mechanism (in this example, the gears 7a to 7c) for transmitting the rotational force of the motor 5 to the first gear 28a can be simplified. The third gear 28c is disposed coaxially with the left roller 21L. The third gear 28c is integrally formed with the above-mentioned support portion 23c (FIG. 4). The second gear 28b is disposed between, and is meshing with, the first gear 28a and the third gear 28c.

As above-mentioned, the right roller bracket 24 has a portion which extends leftward from the positions where the support portions 24c and 24d are formed, while passing on the front side of the left roller bracket 23. As shown in FIGS. 6A and 6B, the right roller bracket 24 is provided, at a central portion in the left-right direction thereof, with a shutter portion 24g for closing the insertion port a of an optical disk. As has been described above, when an optical disk is disposed in the drive position, the pressed portions 23e and 24e of the roller brackets 23 and 24 are pushed forward by the slider 6, and the rollers 21L and 21R are disposed in their retracted positions. In this instance, the shutter portion 24g closes the insertion port a. This ensures that when an optical disk is disposed in the drive position, the user can be inhibited from inserting another optical disk into the insertion port a.

As above-mentioned, when the right roller 21R is in the carrying position, the pressed portion 24e is located rearwardly of the shaft portions 24a and 24b (see FIG. 5A). In addition, when the right roller 21R is located in the carrying position, the shutter portion 24g is located below the shaft portions 24a and 24b (in the example shown in FIG. 5A, the shutter portion 24g is located on the front side and the lower side of the shaft portions 24a and 24b). Therefore, when the pressed portion 24e is pushed forward and downward by the slider 6, as shown in FIG. 6B, the shutter portion 24g is moved upward with the shaft portions 24a and 24b as a center. When the right roller 21R is disposed in the retracted position, the shutter portion 24g closes the insertion port a. In other words, the positions of the right roller 21R and the shutter portion 24g and the shaft portions 24a and 24b are so set that the right roller 21R is lowered and the shutter portion 24g is raised when the right roller bracket 24 is pushed by the slider 6. In the example described here, the base frame 11 is formed with a guide surface 11c for guiding the shutter portion 24g upward and forward.

As has been described above, the shaft portion 23a of the left roller bracket 23 is located rearwardly of and downwardly of the rollers 21L and 21R, whereas the shaft portions 24a and 24b of the right roller bracket 24 are located forwardly of the rollers 21L and 21R. Therefore, when the roller brackets 23 and 24 are pushed by the slider 6, they are rotated in opposite directions, with the shaft portions 23a, 23b, 24a, and 24b as centers. Specifically, the left roller bracket 23 is rotated clockwise, whereas the right roller bracket 24 is rotated counterclockwise. This enables a configuration wherein the roller bracket on one side (in this example, the right roller bracket 24) is provided with the shutter portion 24g, whereas the roller bracket on the other side (in this example, the left roller bracket 23) is provided with the first gear 28a whose position is not changed due to rotation. Incidentally, the shutter portion 24g may not necessarily be provided on the roller bracket 24. In this case, the two shaft portions 24a and 24b may be located coaxially with the shaft portions 23a and 23b. In the case where the shutter portion 24g is not provided on the roller bracket 24, for example, the shaft portions 24a and 24b may also be located rearwardly of and downwardly of the left roller 21L, like the shaft portions 23a and 23b. In this instance, the shaft portions 24a and 24b and the shaft portions 23a and 23b may be aligned on the same straight line.

Figure 7:
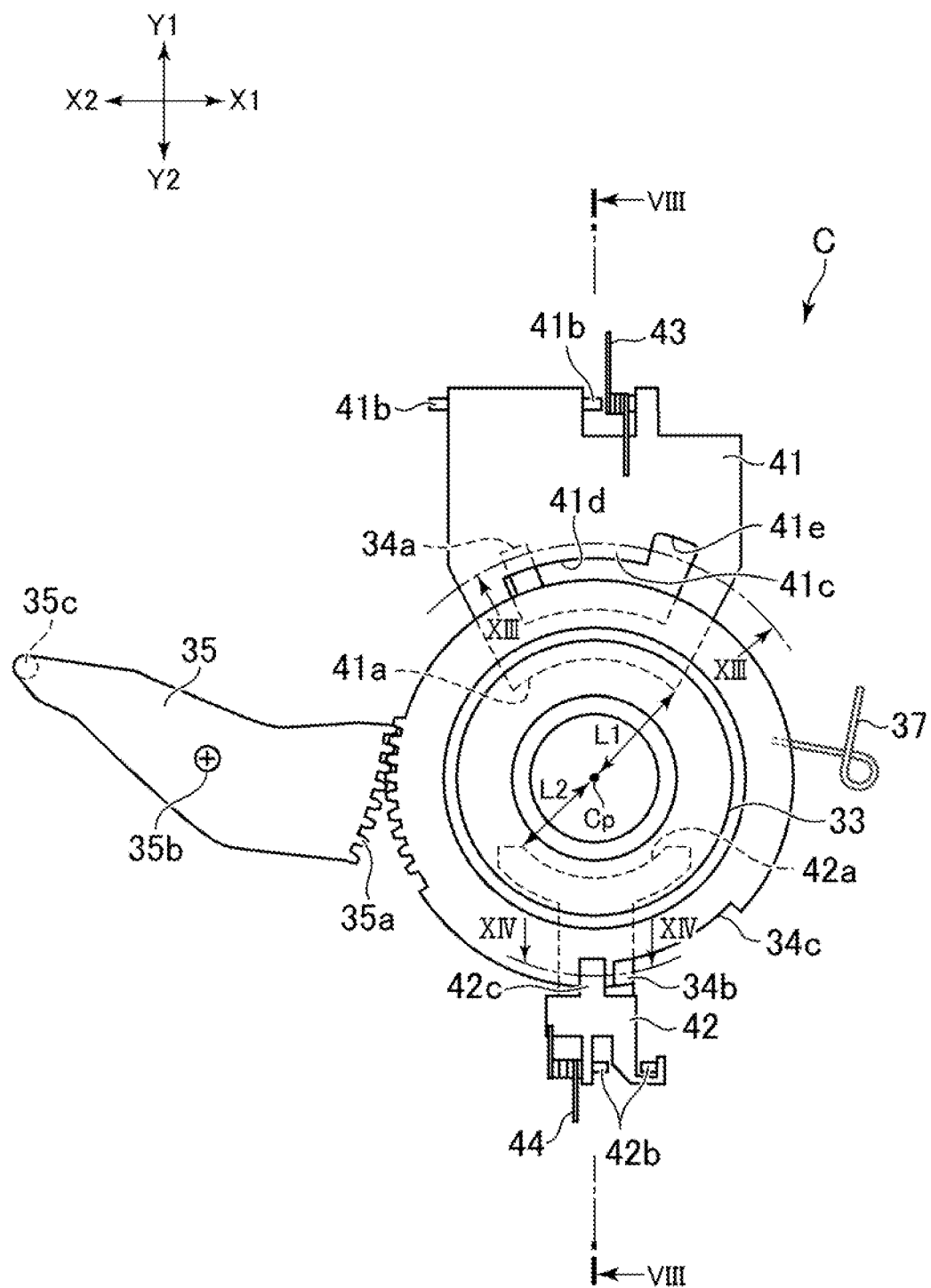
FIG. 7 is a plan view of a chucking mechanism.
Figure 8:
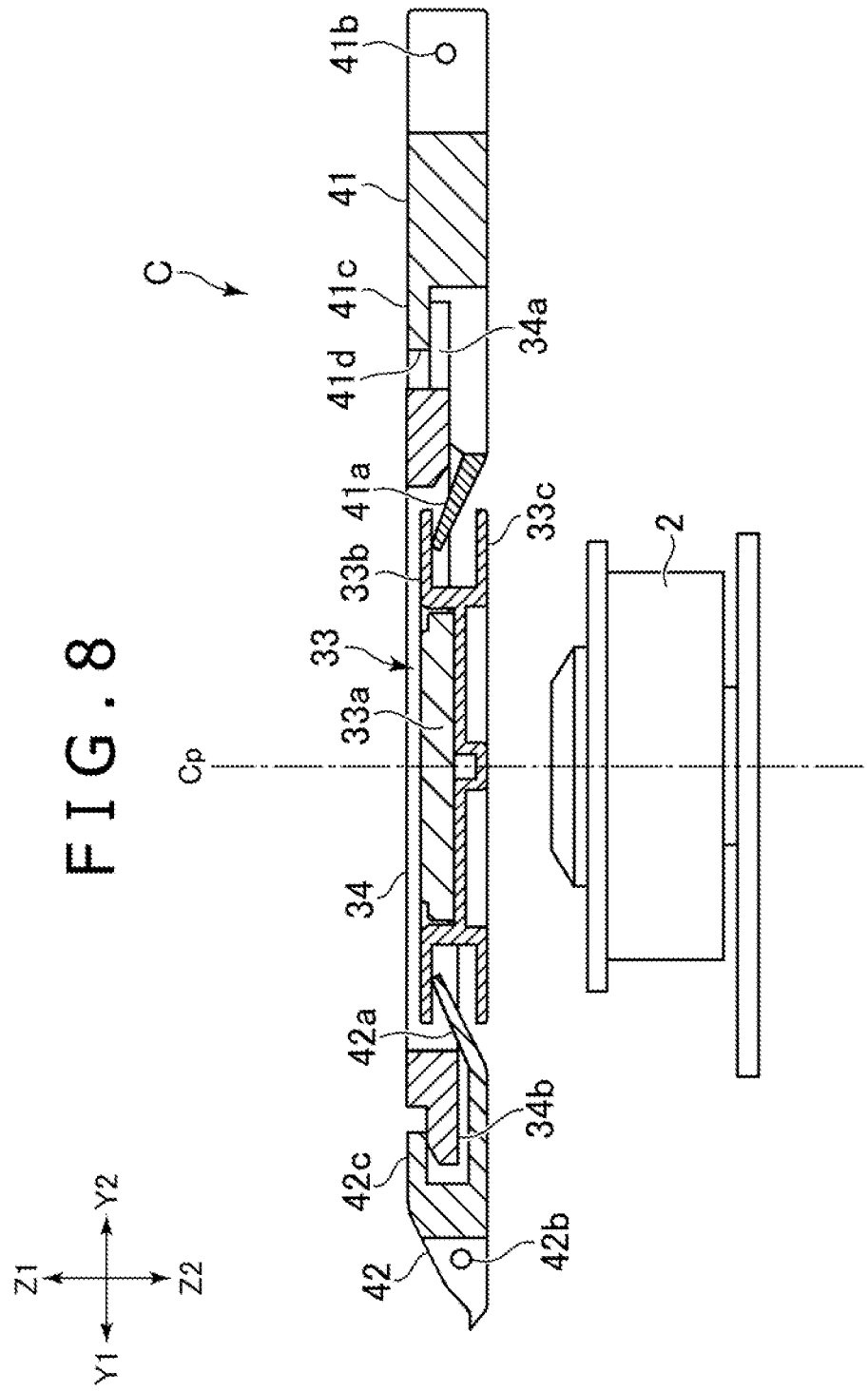
FIG. 8 is a sectional view taken along line VIII-VIII of FIG. 7.
Figure 9A:
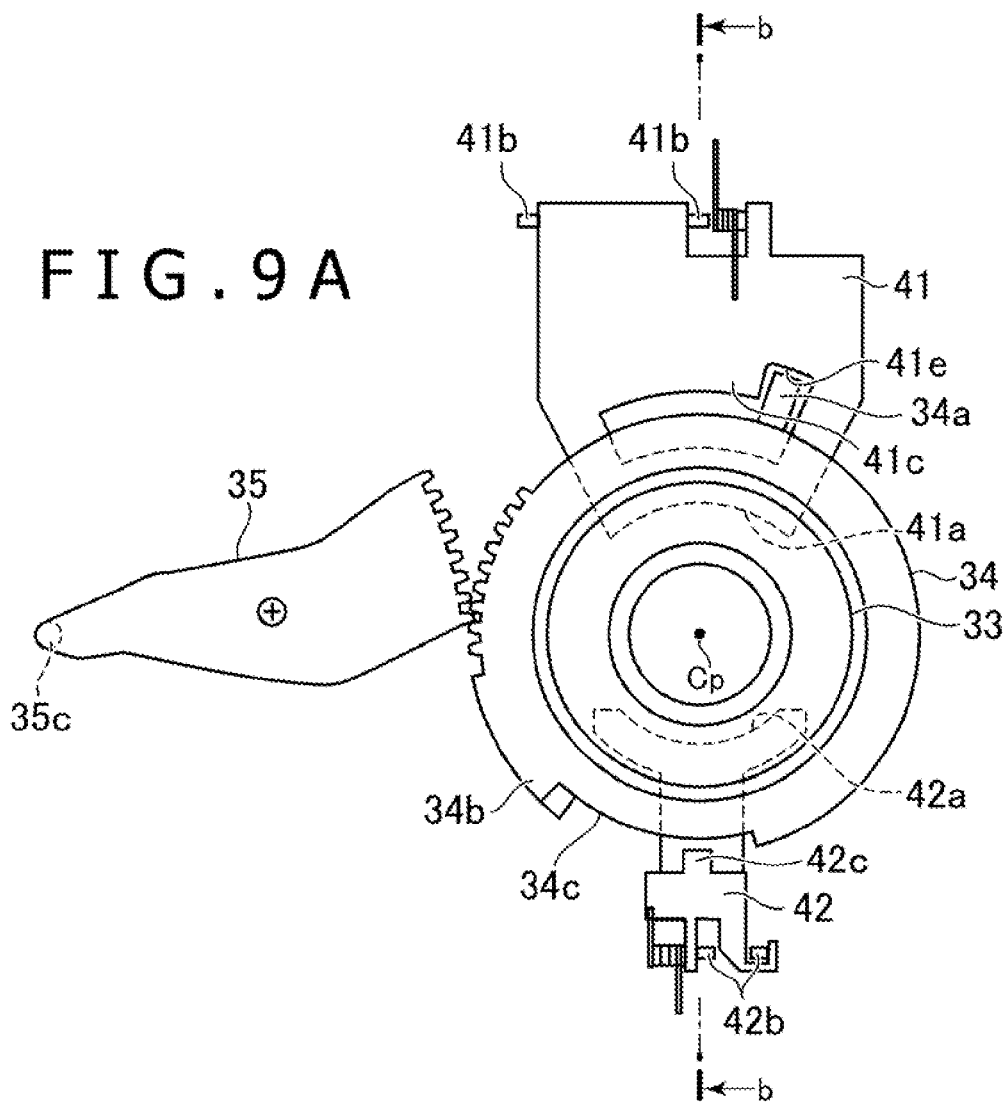
FIGS. 9A and 9B are views showing an operation of the chucking mechanism, wherein a chuck pulley is disposed in a second pulley position.
Figure 9B:
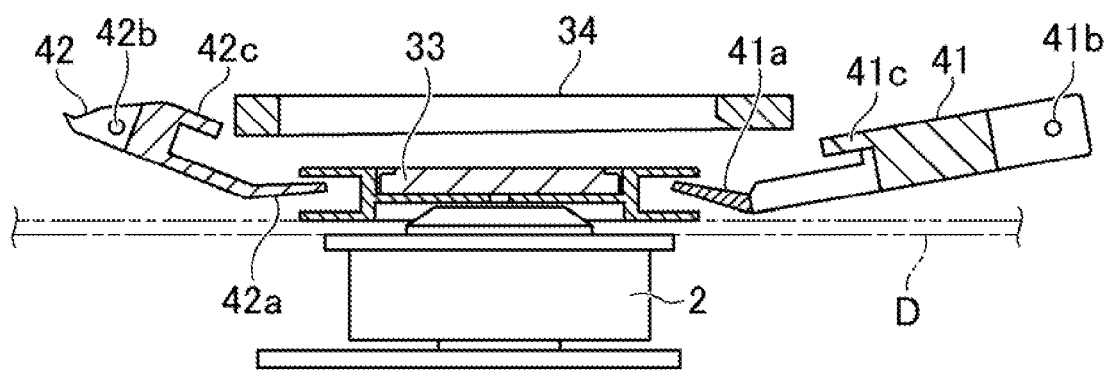
Figure 10A:
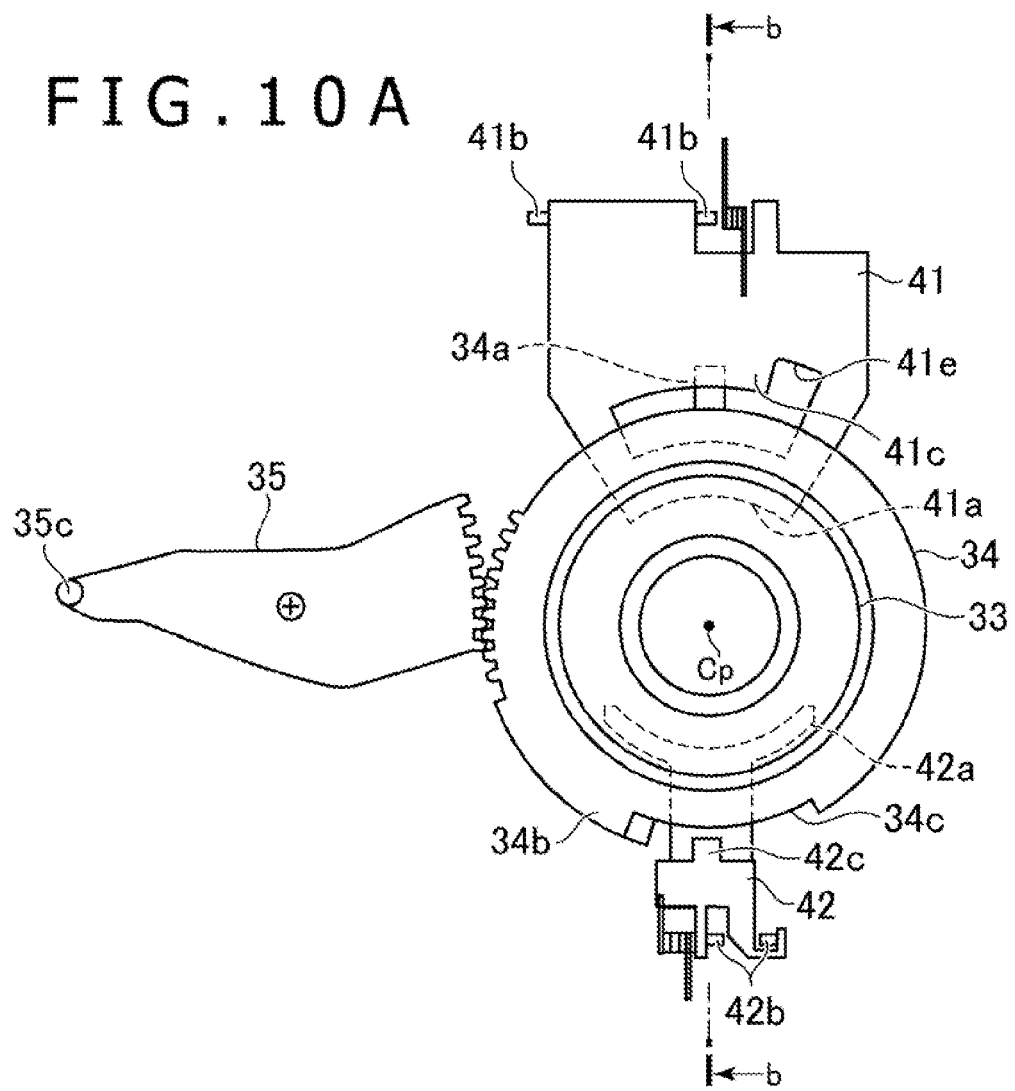
FIGS. 10A and 10B are views showing an operation of the chucking mechanism, wherein the chuck pulley is being moved.
Figure 10B:
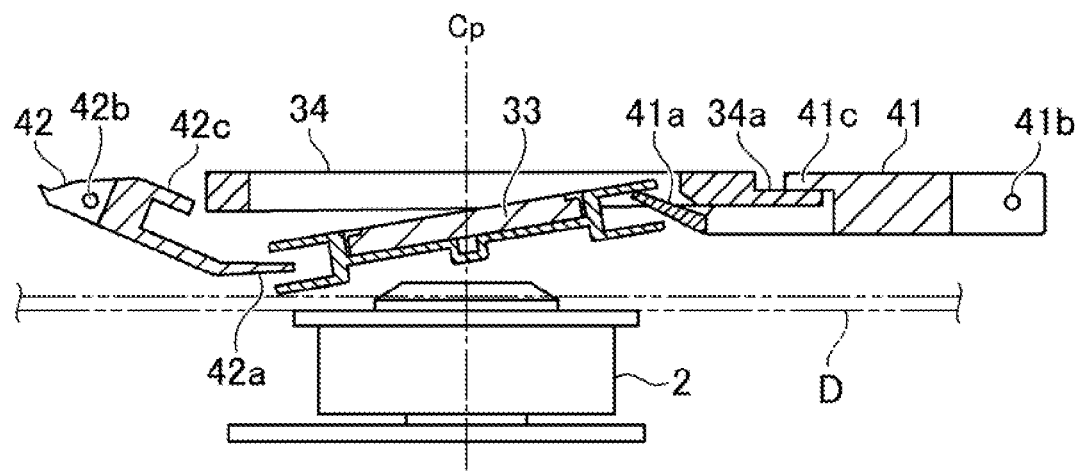
Figure 11:
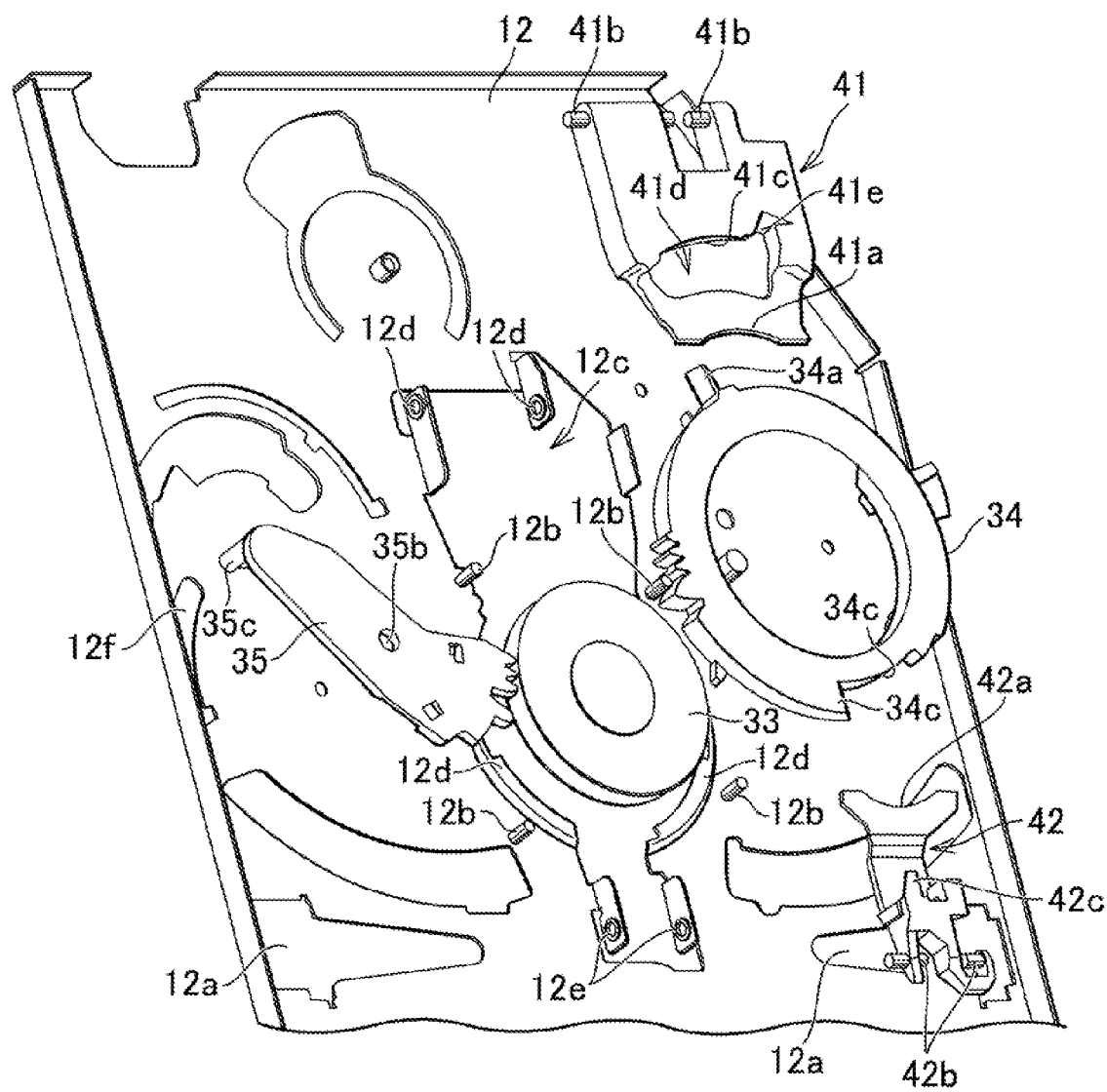
FIG. 11 is a perspective view showing component members of the chucking mechanism in separated state.
Figure 12:
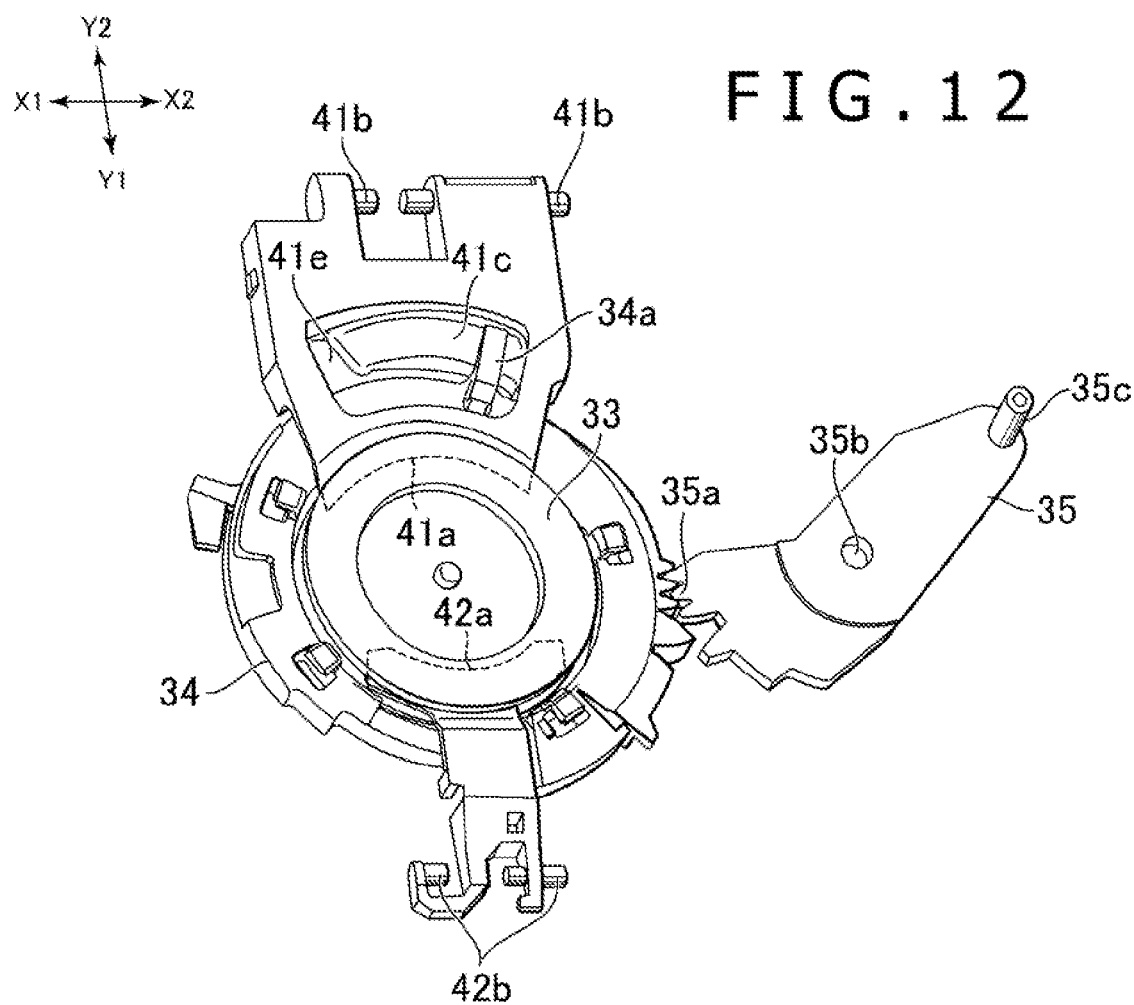
FIG. 12 is a perspective view from below of the chucking mechanism.

Now, the chucking mechanism C will be described. FIG. 7 is a plan view of the chucking mechanism C. FIG. 8 is a sectional view taken along line VIII-VIII of FIG. 7. As shown in these figures, the chucking mechanism C has the chuck pulley 33. The chuck pulley 33 can be moved between a position spaced upward from the turntable 2 (first pulley position) and a position close to the turntable 2 for gripping an optical disk (second pulley position). The chuck pulley 33 as shown in FIGS. 7 and 8 is located in the first pulley position. FIGS. 9A, 9B, 10A, and 10B are figures showing an operation of the chucking mechanism C. FIGS. 9A and 9B show the chuck pulley 33 in the state of being disposed in the second pulley position. FIGS. 10A and 10B show the chuck pulley 33 during a movement thereof. FIGS. 9A and 10A are plan views, while FIGS. 9B and 10B are sectional views taken along line b-b of FIGS. 9A and 10A. FIG. 11 is a perspective view showing components of the chucking mechanism C in separated state. FIG. 12 is a perspective view of the chucking mechanism C as viewed from below.

As shown in FIG. 8, the chuck pulley 33 has a magnet 33a at a central portion thereof. The chuck pulley 33 is attracted toward the turntable 2 by a magnetic force of the magnet 33a. The chuck pulley 33 can be moved in the direction of the axis Cp of the turntable 2 (vertical direction). The chuck pulley 33 is moved between the first pulley position and the second pulley position. When the chuck pulley 33 is disposed in the second pulley position, the chuck pulley 33 and the turntable 2 grip the optical disk D therebetween (see FIG. 9A) by the magnetic force acting between them. As a result, the optical disk D will be rotated as one body with the turntable 2.

The chucking mechanism C has a pulley operating mechanism (41, 42, 34, 35) for moving the chuck pulley 33 between the second pulley position and the first pulley position. The pulley operating mechanism in the example described here has two arms 41 and 42 for supporting the chuck pulley 33, as shown in FIGS. 7 and 11. In addition, the pulley operating mechanism includes an operating ring 34 for moving the arms 41 and 42, and a ring operating lever 35 for rotating the operating ring 34. The top frame 12 has an opening 12c (see FIG. 11) at a position corresponding to the chuck pulley 33 and the arms 41 and 42. The operating ring 34 is supported by an edge of the opening 12c.

As shown in FIG. 7, the two arms 41 and 42 are located to be spaced from each other in the circumferential direction of the turntable 2 and the chuck pulley 33. In the example described here, the arms 41 and 42 are disposed on the opposite sides with reference to the axis of the turntable 2, in other words, with reference to the center of the chuck pulley 33. The arm 41 is disposed on the rear side of the chuck pulley 33, whereas the arm 42 is disposed on the front side of the chuck pulley 33. In the following description, the arm 41 will be referred to as the rear arm, and the arm 42 as the front arm.

The arms 41 and 42 support an outer peripheral portion of the chuck pulley 33. More specifically, as shown in FIG. 8, the chuck pulley 33 is provided at an outer peripheral portion thereof with two flanges 33b and 33c projecting in the radial direction. The two flanges 33b and 33c are spaced from each other in the vertical direction. The arms 41 and 42 have support portions 41a and 42a at their end portions. The support portions 41a and 42a are disposed between the two flanges 33b and 33c, and are caught on the flange 33b on the upper side. Edges of the support portions 41a and 42a are formed in an arcuate shape along the outer peripheral edge of the chuck pulley 33. This ensures that the chuck pulley 33 can be supported by the support portions 41a and 42a with enhanced stability. Preferably, the edges of the support portions 41a and 42a are substantially equal in length. This enables further enhancement of the stability of support of the chuck pulley 33.

As shown in FIG. 8, the rear arm 41 has a fulcrum portion 41b spaced from the support portion 41a along a radial direction (in the example described here, on the rear side) of the chuck pulley 33. The support portion 41a is moved in the vertical direction (the direction of the axis Cp of the turntable 2), with the fulcrum portion 41b as a center. In addition, the rear arm 41 has an operated portion 41c. The operating ring 34 is engaged with the operated portion 41c so as to pull the rear arm 41 upward against the magnetic force of the chuck pulley 33.

Like the rear arm 41, the front arm 42 has a fulcrum portion 42b spaced from the support portion 42a along a radial direction (in the example described here, on the front side) of the chuck pulley 33. The support portion 42 is moved in the vertical direction, with the fulcrum portion 42b as a center.

Besides, the front arm 42 has an operated portion 42c. The operating ring 34 is engaged with the operated portion 42c so as to pull the front arm 42 upward against the magnetic force of the chuck pulley 33.

The arms 41 and 42 can be moved between the positions shown in FIG. 8 (hereinafter referred to as the first positions) and the positions shown in FIGS. 9A and 9B (hereinafter referred to as the second positions), with the fulcrum portions 41b and 42b as centers. In the example described here, the arms 41 and 42 are disposed to be horizontal when located in the first positions. In other words, the arms 41 and 42 are disposed to be perpendicular to the axis Cp of the turntable 2. The arms 41 and 42 are inclined relative to a horizontal plane when located in the second positions. When the arms 41 and 42 are disposed in the first positions, the chuck pulley 33 is disposed in the first pulley position spaced from the turntable 2. When the arms 41 and 42 are disposed in the second positions, the chuck pulley 33 is disposed in the second pulley position close to the turntable 2.

As shown in FIGS. 10A and 10B, when the chuck pulley 33 is moved between the second pulley position at which an optical disk is fixed and the first pulley position spaced upward from the second pulley position, the pulley operating mechanism composed of the arms 41 and 42 inclines the chuck pulley 33 relative to the turntable 2 (namely, inclines the chuck pulley 33 relative to a plane perpendicular to the axis Cp of the turntable 2), and moves the chuck pulley 33 toward or away from the turntable 2. Specifically, when the chuck pulley 33 is moved between the first pulley position and the second pulley position, the pulley operating mechanism moves one of the two arms 41 and 42 prior to the other of the two arms 41 and 42. In the example described here, the pulley operating mechanism moves the front arm 42 prior to the rear arm 41, at the time of lowering the chuck pulley 33 from the first pulley position toward the second pulley position. Thus, the pulley operating mechanism inclines the front arm 42 and disposes the front arm 42 in the second position, prior to the rear arm 41. As a result, the chuck pulley 33 approaches the turntable 2 while in the posture of being inclined relative to the turntable 2, namely, in the posture of being inclined relative to the plane perpendicular to the axis Cp of the turntable 2. This reduces an impact sound generated when the chuck pulley 33 is attracted onto the turntable 2 by the magnetic force.

On the contrary, when the chuck pulley 33 is pulled up from the second pulley position toward the first pulley position, the pulley operating mechanism moves the rear arm 41 prior to the front arm 42. Thus, the pulley operating mechanism pulls the rear arm 41 upward and disposes the rear arm 41 into the first position, prior to the front arm 42. Consequently, the chuck pulley 33 is inclined relative to the turntable 2 and is separated from the turntable 2. This makes it possible to reduce the force required for releasing the chuck pulley 33 from the turntable 2 against the magnetic force.

The two arms 41 and 42 are moved between the first positions (horizontal positions) and the second positions (inclined positions) by a common movable member which moves under power of the motor 5. As shown in FIGS. 7 and 11, the pulley operating mechanism in the example described here has the operating ring 34 as the common movable member. The operating ring 34 is so disposed as to surround the chuck pulley 33. The operating ring 34 can rotate about the axis Cp of the turntable 2. In the example described here, the top frame 12 is formed with a plurality of pins 12b which are so disposed as to surround the operating ring 34. The operating ring 34 is rotated while being guided by the plurality of pins 12b.

As shown in FIGS. 7 and 8, the operating ring 34 is provided at its outer peripheral portion with a rear engaging portion 34a which engages with the operated portion 41c of the rear arm 41 and which maintains the rear arm 41 in the first position. The rear engaging portion 34a in the example described here is a projection which projects rearward (see FIG. 11). The rear arm 41 is formed with an opening 41d (see FIG. 11). The operated portion 41c is provided at an edge of the opening 41d. As shown in FIGS. 10A and 10B, an outer peripheral portion of the operating ring 34 is so located as to cover the opening 41d, and the rear engaging portion 34a extends rearward on the lower side of the operated portion 41c. This ensures that the rear arm 41 is maintained in the first position. That portion of the rear arm 41 which is forwardly of the opening 41d extends forward on the lower side of the operating ring 34, and its end portion (namely, the support portion 41a) supports the chuck pulley 33.

As shown in FIGS. 7 and 8, the operating ring 34 is provided at its outer peripheral portion with a front engaging portion 34b which engages with the operated portion 42c of the front arm 42 and which maintains the front arm 42 in the first position. In the example described here, a front-side part of the outer peripheral portion of the operating ring 34 functions as the front engaging portion 34b. The operated portion 42c of the front arm 42 is a projection which projects rearward (see FIG. 11) and which is located on the upper side of the front engaging portion 34b of the operating ring 34. This ensures that the front arm 42 is maintained in the first position. The front arm 42 extends rearward on the lower side of the operating ring 34, and its end portion (namely, the support portion 42a) supports the chuck pulley 33.

The operating ring 34 and the rear arm 41 are so formed that the engagement between the rear engaging portion 34a and the operated portion 41c is released by rotation of the operating ring 34. In the example described here, as shown in FIGS. 11 and 12, the rear arm 41 is provided, at an end portion of the operated portion 41c in the circumferential direction, with a cutout 41e continuous with the opening 41d. Therefore, when the operating ring 34 is rotated and the rear engaging portion 34a reaches the cutout 41e, as shown in FIGS. 9A and 9B, the engagement between the rear engaging portion 34a and the operated portion 41c is released. As a result, the rear arm 41 is lowered from the first position toward the second position. Thereafter, when the operating ring 34 is rotated in the reverse direction, the rear engaging portion 34a engages with the operated portion 41c again, to pull the rear arm 41 upward from the second position into the first position.

Figure 13:
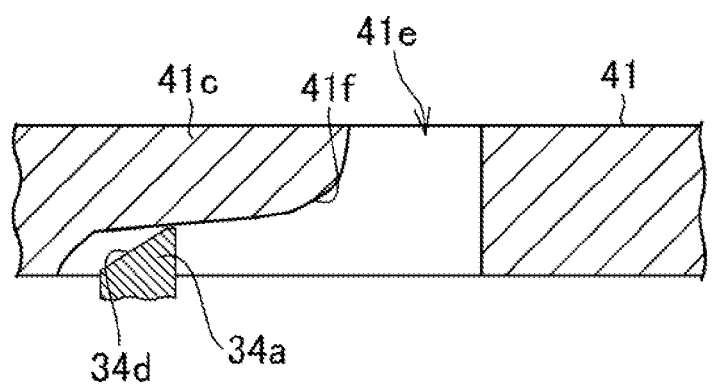
FIG. 13 is a sectional view taken along line XIII-XIII of FIG. 7.

FIG. 13 is a sectional view taken along line XIII-XIII of FIG. 7. As shown in this figure, a lower surface of the operated portion 41c of the rear arm 41 includes a slant surface 41f whose height gradually increases toward an end portion on the cutout 41 side. The rear engaging portion 34a also has a slant surface 34d. These slant surfaces 41f and 34d permit smooth engagement between the rear engaging portion 34a and the operated portion 41c. As a result, the rear arm 41 is moved upward in a smooth manner. In other words, the rear arm 41 is pulled upward from the second position into the first position in a smooth manner.

The operating ring 34 and the front arm 42 are so formed that the engagement between the front engaging portion 34b and the operated portion 42c of the front arm 42 is released by rotation of the operating ring 34. In the example described here, as shown in FIG. 7, the operating ring 34 is provided at its outer peripheral portion with a cutout 34c which is located in the circumferential direction in relation to the front engaging portion 34b. Therefore, when the operating ring 34 is rotated and the operated portion 42c of the front arm 42 reaches the cutout 34c, as shown in FIGS. 10A and 10B, the engagement between the front engaging portion 34b and the operated portion 42c is released. Consequently, the front arm 42 is lowered from the first position toward the second position. Thereafter, when the operating ring 34 is rotated in the reverse direction, the font engaging portion 34b engages with the operated portion 42c again, to pull the front arm 42 upward from the second position toward the first position.

Figure 14:
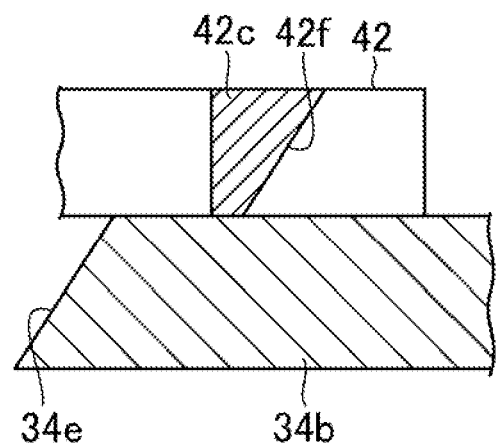
FIG. 14 is a sectional view taken along line XIV-XIV of FIG. 7.

FIG. 14 is a sectional view taken along line XIV-XIV of FIG. 7. As shown in this figure, the operated portion 42c of the front arm 42 has a slant surface 42f. Besides, the front engaging portion 34b also has a slant surface 34e at an end portion thereof. These slant surfaces 42f and 34e permit smooth engagement between the front engaging portion 34b and the operated portion 42c. As a result, the front arm 42 is moved upward in a smooth manner. In other words, the front arm 42 is pulled upward from the second position toward the first position in a smooth manner.

As shown in FIG. 7, the cutout 41e in the rear arm 41 is located at a position spaced along a clockwise direction from the operated portion 41c. In addition, the cutout 34c in the operating ring 34 is located at a position spaced along a counterclockwise direction from the front engaging portion 34b. This results in that the rotating direction of the operating ring 34 for releasing the engagement between the rear arm 41 and the operated portion 41c is coincident with the rotating direction of the operating ring 34 for releasing the engagement between the front arm 42 and the operated portion 42c. Here, the engagements are released when the operating ring 34 is rotated clockwise. In addition, the engagements are again made when the operating ring 34 is rotated counterclockwise.

The operating ring 34 is rotated between a first ring position and a second ring position. The first ring position is the position of the operating ring 34 as shown in FIG. 7. In this position, the rear engaging portion 34a and the front engaging portion 34b are in engagement with the operated portions 41c and 42c of the arms 41 and 42, respectively. The second ring position is the position of the operating ring 34 as shown in FIGS. 9A and 9B. In this position, the engagements between the engaging portions 34a and 34b and the operated portions 41c and 42c are released.

The portions to be engaged (and disengaged) are so formed that a time gap exists between the timing of release of the engagement between the operated portion 41c of the rear arm 41 and the rear engaging portion 34a of the operating ring 34 and the timing of release of the engagement between the operated portion 42c of the front arm 42 and the front engaging portion 34b of the operating ring 34. This ensures that, at the time of moving the chuck pulley 33, one of the two arms 41 and 42 is moved into the first position or the second position, prior to the other of the two arms 41 and 42. In the example described here, the portions to be engaged (and disengaged) are so formed that the timing of release of the engagement between the operated portion 41c of the rear arm 41 and the rear engaging portion 34a is delayed behind the timing of release of the engagement between the operated portion 42c of the front arm 42 and the front engaging portion 34b (see FIGS. 10A and 10B). Specifically, in the state where the operating ring 34 is disposed in the first ring position, as shown in FIG. 7, the distance (angle) from the rear engaging portion 34a to the cutout 41e in the rear arm 41 is greater than the distance (angle) from the operated portion 42c of the font arm 42 to the cutout 34C in the operating ring 34. This ensures that when the operating ring 34 is rotated from the first ring position toward the second ring position, the rear arm 41 is lowered from the first position toward the second position with a delay behind a corresponding movement of the front arm 42. On the contrary, when the operating ring 34 is rotated from the second ring position toward the first ring position, the rear arm 41 is pulled upward from the second position toward the first position, prior to the front arm 42. Consequently, the force required for separating the chuck pulley 33 from the turntable 2 (the rotational force for the operating ring 34) can be reduced.

As shown in FIG. 7, the operating ring 34 is formed with a gear at an outer periphery thereof. This gear is in mesh with a gear 35a formed on the ring operating lever 35. The ring operating lever 35 has a pressed portion 35c on the opposite side to the gear 35a, with a fulcrum portion 35b therebetween. The pressed portion 35c projects downward through a groove 12f formed in the top frame 12 (see FIGS. 11 and 12). On the base frame 11, the slider 6 for moving the carrying roller 20 is disposed, as above-mentioned. The slider 6 engages with the pressed portion 35c when sliding in the front-rear direction. When an optical disk is disposed in the drive position and the slider 6 moves forward, the pressed portion 35c moves forward together with the slider 6. As a result, the operating ring 34 is rotated clockwise from the first ring position toward the second ring position. On the contrary, when an instruction to feed out the optical disk is inputted and the slider 6 is moved rearward by the driving of the motor 5, the pressed portion 35c moves rearward together with the slider 6. As a result, the operating ring 34 is rotated counterclockwise from the second ring position toward the first ring position. Thus, in the present embodiment, the member for moving the carrying roller 20 of the carrying mechanism A from the carrying position to the retracted position and the member for rotating the operating ring 34 are provided as a common member.

As shown in FIG. 7, the rear arm 41 is fitted with a spring 43. The front arm 42 is fitted with a spring 44. The springs 43 and 44 bias the arms 41 and 42 toward the second positions, respectively. This ensures that the arms 41 and 42 are stably disposed in the second positions in the condition where the engagements between the operating ring 34 and the arms 41 and 42 are released. Further, a spring 37 is mounted to the outer periphery of the operating ring 34. The spring 37 biases the operating ring 34 toward the first ring position. This ensures that the operating ring 34 is stably disposed in the first ring position in the condition where the engagement between the ring operating lever 35 and the slider 6 is released. Motions of the slider 6 will be described in detail later.

As has been described above, when the chuck pulley 33 is pulled upward from the second pulley position to the first pulley position, the rear arm 41 is pulled upward from the second position to the first position, prior to the front arm 42. At the time of detaching the chuck pulley 33 from the turntable 2 against the magnetic force, a comparatively large force is required at first. The rear arm 41 and the front arm 42 are so formed that a force (pulling-up force) exerted on the chuck pulley 33 from the rear arm 41 is greater than a force (pulling-up force) exerted on the chuck pulley 33 from the front arm 42. In the example described here, as shown in FIG. 7, the distance L1 from the support portion 41a of the rear arm 41 to the center of the chuck pulley 33 is greater than the distance L2 from the support portion 42a of the front arm 42 to the center of the chuck pulley 33.

As shown in FIG. 7, the operated portion 41c of the rear arm 41 is located between the fulcrum portion 41b and the support portion 41a. Similarly, the operated portion 42c of the front arm 42 is located between the fulcrum portion 42b and the support portion 42a. The distance between the fulcrum portion 41b and the support portion 41a of the rear arm 41 and the distance between the fulcrum portion 42b and the support portion 42a of the front arm 42 are different from each other. This makes it easy to make such a setting that the force with which the rear arm 41 pulls the chuck pulley 33 upward and the force with which the front arm 42 pulls the chuck pulley 33 upward are different from each other. In the example described here, the positional relationship among three parts of the rear arm 41 and the positional relationship among three parts of the front arm 42 are so set that the leverage of the rear arm 41 is greater than the leverage of the front arm 42. Specifically, the ratio of the distance from the operated portion 41c to the fulcrum portion 41b to the distance from the support portion 41a to the fulcrum portion 41b is greater than the ratio of the distance from the operated portion 42c to the fulcrum portion 42b to the distance from the support portion 42a to the fulcrum portion 42b. As above-mentioned, at the time of pulling the chuck pulley 33 upward (at the time of moving the chuck pulley 33 from the second pulley position to the first pulley position), the rear arm 41 is moved prior to the front arm 42. Therefore, the rear arm 41 needs a greater force to move the chuck pulley 33, as compared with the front arm 42. In the example described here, the leverage of the rear arm 41 is set higher than the leverage of the front arm 42.

The fulcrum portions 41b and 42b are rotatably supported by the top frame 12. As shown in FIG. 11, the top frame 12 is formed with a support portion 12d for supporting the fulcrum portion 41b. In addition, the top frame 12 is formed with a support portion 12e for supporting the fulcrum portion 42b. Such a layout of the fulcrum portions 41b and 42b ensures that the degree of freedom as to the positional relationships among the three kinds of parts of the arms 41 and 42 (the support portions 41a and 42a, fulcrum portions 41b and 42b, and operated portions 41c and 42c) can be increased, as compared, for example, with a structure in which the fulcrum portions 41b and 42b are formed on the operating ring 34. As a result, it becomes easier to adjust the forces exerted on the chuck pulley 33 from the arms 41 and 42.

The width (the width in the circumferential direction) of the part between the support portion 41a and the fulcrum portion 41b of the rear arm 41 is greater than the width of the part between the support portion 42a and the fulcrum portion 42b of the front arm 42. This makes it possible to set the support portion 41a to be higher than the support portion 42a in rigidity.

Finally, the configuration of the centering mechanism B and the operations (motions) of the above-mentioned carrying mechanism A and chucking mechanism C will be described below. FIGS. 15A to 20 are plan views for showing the configuration of the centering mechanism B and the operations (motions) of the carrying mechanism A and the chucking mechanism C. FIGS. 15A to 17 illustrate the operations (motions) in the case where an optical disk D with a diameter of 12 cm is inserted, while FIGS. 18A to 20 illustrate the operations (motions) in the case where an optical disk D2 with a diameter of 8 cm is inserted. FIGS. 15A, 16A, 18A and 19A show the centering mechanism B. FIGS. 15B, 16B, 18B and 19B show the above-mentioned slider 6, ring operating lever 35, and operating ring 34. In addition, FIGS. 17 and 20 also show the slider 6, the ring operating lever 35, and the operating ring 34. As above-mentioned, the slider 6 is disposed inside the base frame 11. The ring operating lever 35, the operating ring 34, and a slider pressing lever 56 which is to be described later are disposed on the top frame 12. In FIGS. 15B, 16B, 18B and 19B as well as FIGS. 17 and 20, the top frame 12 and arms 51L and 51R and the like constituting the centering mechanism B are omitted, for illustrating the operations (motions) of the slider 6, the ring operating lever 35, the operating ring 34 and the slider pressing lever 56.

Figure 15A:
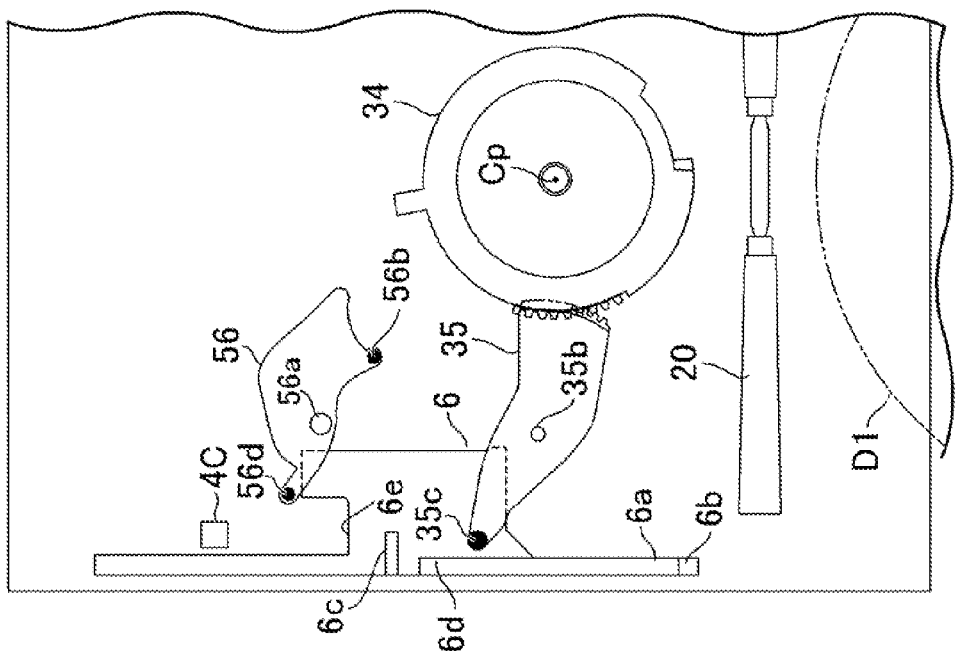
FIGS. 15A and 15B are views showing motions of a centering mechanism, a carrying mechanism and the chucking mechanism.

The centering mechanism B is disposed on the top frame 12. As shown in FIG. 15A, the centering mechanism B is configured generally in left-right symmetry. The centering mechanism B has left and right detection arms 51L and 51R at frontmost portions thereof. In addition, the centering mechanism B has left and right first arms 52L and 52R, left and right second arms 53L and 53R, left and right first gears 54L and 54R, and left and right second gears 55L and 55R.

Each of the detection arms 51L and 51R is provided at a tip thereof with a projection 51a projecting downward while passing through a hole (not shown) formed in the top frame 12. As shown in FIG. 15A, the detection arms 51L and 51R are opened in leftward and rightward directions when the projections 51a are contacted by an edge of an optical disk D1. Besides, the detection arms 51L and 51R are supported respectively by shaft portions 52a provided on the first arms 52L and 52R. The first arms 52L and 52R can be rotated respectively about shaft portions 52b attached to the top frame 12. The second arms 53L and 53R can be rotated respectively about shaft portions 53a attached to the top frame 12. Gears 52c of the first arms 52L and 52R are in mesh with gears formed on the second arms 53L and 53R, respectively. Gears 53b on the second arms 53L and 53R are in mesh with the second gears 55L and 55R via the first gears 54L and 54R, respectively. The two second gears 55L and 55R are in mesh with each other. This ensures that the operations (motions) of the arms 52L and 53L on the left side and the operations (motions) of the arms 52R and 53R on the right side are synchronous with each other. For instance, when the arms 52L and 53L on the left side are rotated, the arms 52R and 53R on the right side are also rotated.

Figure 15B:
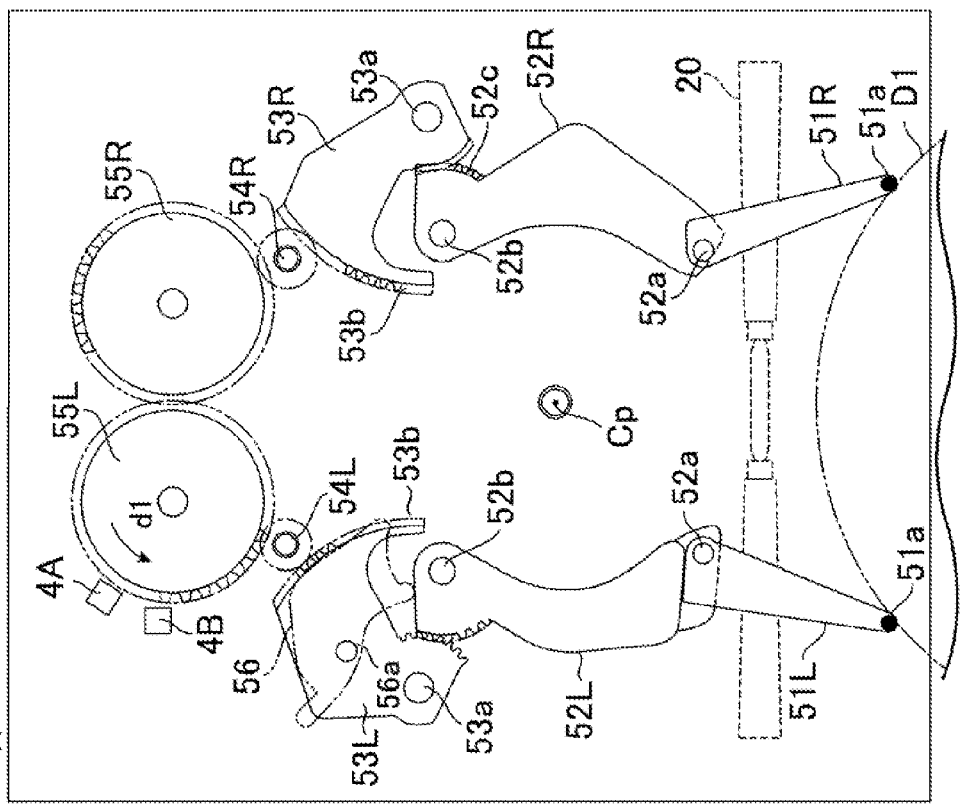

As has been mentioned above, the slider 6 is disposed on the base frame 11. As shown in FIG. 15B, the centering mechanism B has the slider pressing lever 56 for pushing the slider 6 forward. A shaft portion 56a of the slider pressing lever 56 is attached to the second arm 53L on the left side. The slider pressing lever 56 is rotatable about the shaft portion 56a. In addition, as the second arm 53L on the left side rotates with the shaft portion 53a as a center, the slider pressing lever 56 moves with the shaft portion 53a as a center, together with the second arm 53L on the left side. The slider pressing lever 56 is formed with a pressing portion 56d which extends downward. The slider 6 has a first pressed portion 6e at a rear portion thereof. In an initial state of the centering mechanism B, the pressing portion 56d is spaced rearward from the first pressed portion 6e of the slider 6.

Now, operations (motions) of the mechanisms upon insertion of an optical disk D1 having a diameter of 12 cm will be described. The detection arms 51L and 51R are formed at their tips with the projections 51a projecting downward through the holes (not shown) formed in the top frame 12. In the initial state of the centering mechanism B, the projections 51a are located in an optical disk carrying path. Therefore, when the optical disk D1 is inserted, as shown in FIG. 15A, the projections 51a are contacted by the edge of the optical disk D1, whereby the detection arms 51L and 51R are opened in leftward and rightward directions. As a result, the arms 52L, 53L, 52R, and 53R are rotated with the shaft portions 52b and 53a as centers, and the second gear 55L on the left side is rotated counterclockwise (see arrow d1). Since the left and right second gears 55L and 55R are in mesh with each other, the second gear 55L on the left side is rotated counterclockwise irrespectively of which one of the left and right detection arms 51L and 51R is contacted by the optical disk D1, for example.

Three sensors 4A, 4B, and 4C are provided on the substrate 5a to which the motor 5 is mounted as above-mentioned. The first sensor 4A is a sensor for detecting the rotation of the second gear 55L. When the second gear 55L is rotated by a predetermined angle, the first sensor 4A is turned from an OFF state into an ON state. This triggers the motor 5 to start rotating. The rotational force of the motor 5 is transmitted through the gears 7a to 7c (shown in FIG. 1) to the first gear 28a (see FIG. 3) provided in the carrying mechanism A. This causes the carrying roller 20 to start rotating, so that the optical disk D1 is carried by the carrying roller 20.

Figure 16B:
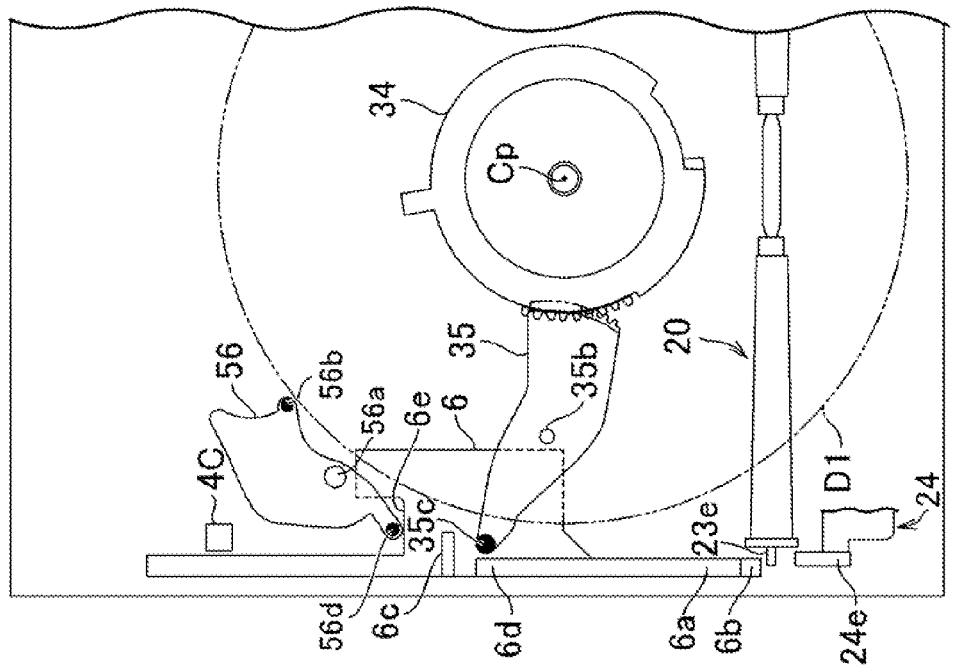
FIGS. 16A and 16B are views showing motions of the centering mechanism, the carrying mechanism and the chucking mechanism.
Figure 16A:
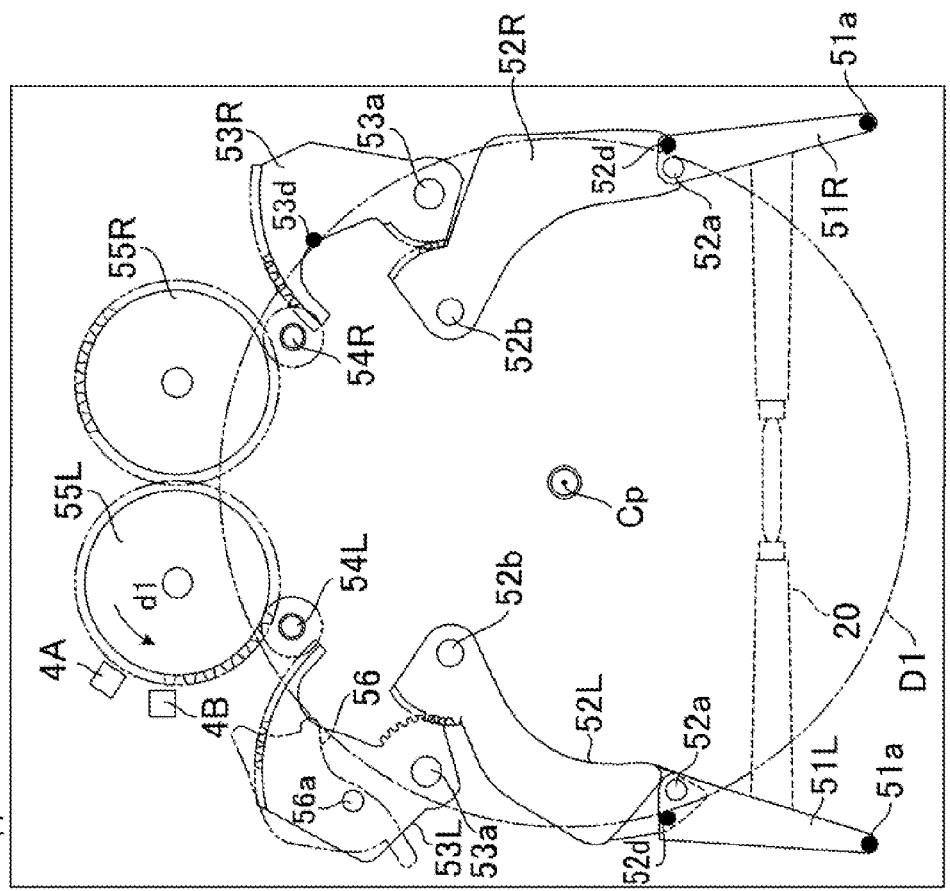

As shown in FIG. 16A, the first arms 52L and 52R are formed, at their tips, with positioning portions 52d which project downward through holes formed in the top frame 12. In addition, the second arm 53R on the right side is also formed with a positioning portion 53d which projects downward through a hole formed in the top frame 12. The slider pressing lever 56 is formed with a positioning portion 56b (see FIG. 16B) which projects downward through a hole formed in the top frame 12. The optical disk D1 is carried until it makes contact with these four positioning portions 52d, 52d, 53d, and 56b, and is positioned in the drive position by the positioning portions 52d, 52d, 53d, and 56b. Specifically, in the state wherein the optical disk D1 is positioned by the positioning portions 52d, 52d, 53d, and 56b, the center of the optical disk D1 agrees with the position of the axis Cp of the turntable 2, and, in this moment, the carrying of the optical disk D1 ends.

The second sensor 4B is a sensor for detecting the rotation of the second gear 55L on the left side. The second sensor 4B is turned from an OFF state into an ON state when the second gear 55L is rotated by a preset rotation amount. Here, the preset rotation amount is a rotation amount of the second gear 55L upon insertion of an optical disk D1 with a diameter of 12 cm into the drive position. When the optical disk D1 with a diameter of 12 cm is inserted, the rotation amount of the second gear 55L is greater than that when an optical disk D2 with a diameter of 8 cm is inserted. In other words, the second sensor 4B is turned into the ON state upon insertion of the optical disk D1 with a diameter of 12 cm into the drive position, but it is not turned into the ON state upon insertion of the optical disk D2 with a diameter of 8 cm, since the rotation amount of the second gear 55L is small. Accordingly, the size of the optical disk inserted can be detected based on an output from the second sensor 4B.

As shown in FIG. 16B, when the slider pressing lever 56 is moved together with the left-side second arm 53L, with the shaft portion 53a of the second arm 53L as a center, and the positioning portion 56b is rotated about the shaft portion 56a by being pressed by the optical disk D1, the pressing portion 56d presses the first pressed portion 6e of the slider 6 forward. As shown in FIG. 16B, the slider 6 is formed with a first pressing portion 6c for pressing the ring operating lever 35 constituting the chucking mechanism C. In the state as shown in FIG. 16B, namely, in the state wherein the slider 6 is making contact with the slider pressing lever 56, the first pressing portion 6c of the slider 6 is spaced rearward from the pressed portion 35c of the ring operating lever 35. At this stage, therefore, the operating ring 34 has not yet started rotating.

Figure 17:
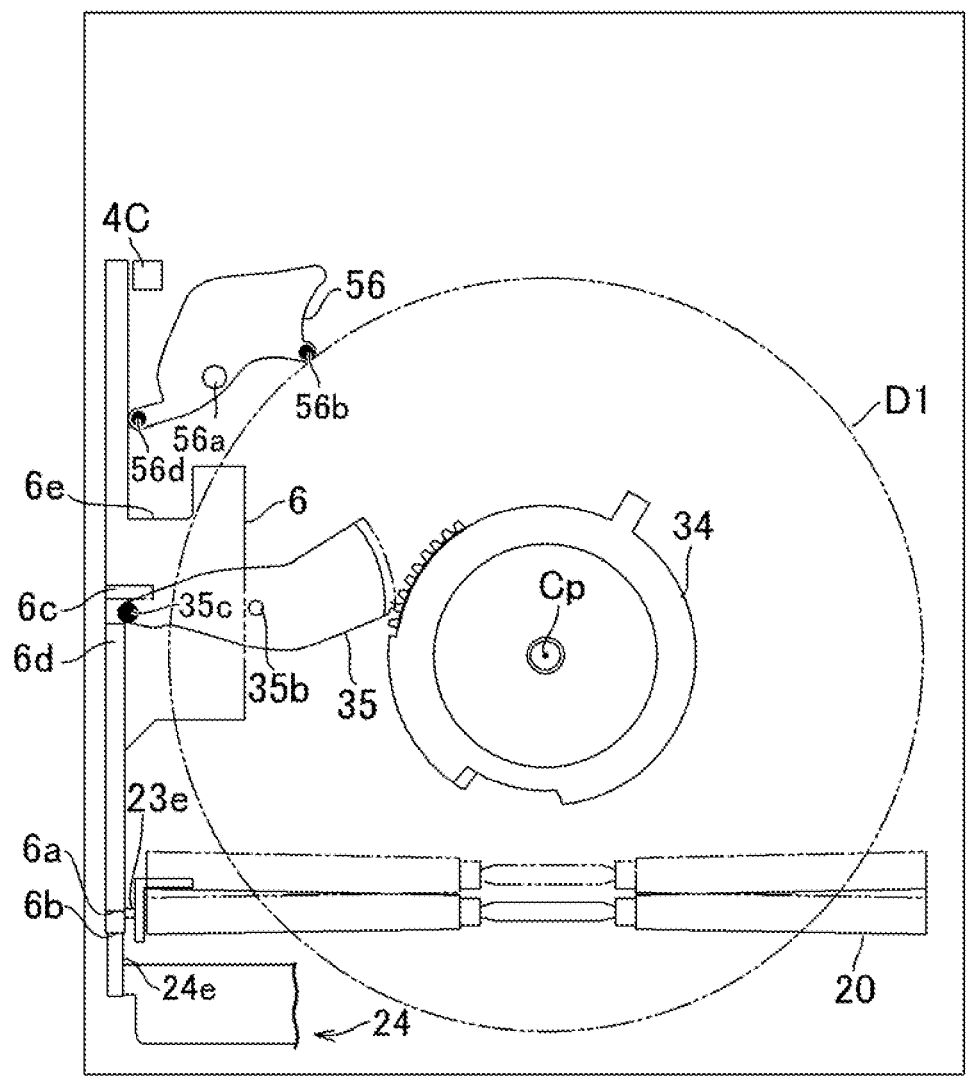
FIG. 17 is a view showing motions of the centering mechanism, the carrying mechanism and the chucking mechanism.

The slider 6 is formed with a rack (not shown) for meshing with the gear 7c (see FIG. 1). When the slider 6 is pressed by the slider pressing lever 56 and is thereby moved forward, the rack of the slider 6 and the gear 7c mesh with each other. This causes the slider 6 to start moving forward under power of the motor 5. As a result, as shown in FIG. 17, the slider 6 moves further forward, and the roller operating portions 6a and 6b push the pressed portions 23e and 24e of the roller brackets 23 and 24 further forward. This results in that the rollers 21R and 21L are disposed in the retracted positions as shown in FIG. 5B, and that the shutter portion 24g of the right roller bracket 24 closes the insertion port a as shown in FIG. 6B.

In addition, as shown in FIG. 17, the first pressing portion 6c of the slider 6 pushes the pressed portion 35c of the ring operating lever 35 forward. As a result, the operating ring 34 is rotated from the first ring position toward the second ring position, and the chuck pulley 33 is lowered, to be disposed in the second pulley position (see FIGS. 9A and 9B). As above-mentioned, in the process in which the operating ring 34 moves from the first pulley position to reach the second pulley position, the front arm 42 is lowered toward the second position prior to the rear arm 41 (see FIGS. 10A and 10B). The third sensor 4C mounted to the substrate 5a is a sensor for detecting the operation (motion) of the slider 6. The third sensor 4C is turned into an ON state when a movement of the slider 6 is completed, namely, when the slider 6 has completely pressed down the pressed portions 23e and 24e of the roller brackets 23 and 24. This triggers stopping of the driving of the motor 5. The foregoing is the operations (motions) of the mechanisms at the time of insertion of the optical disk D1.

At the time of discharge of the optical disk D1, the mechanisms operate in the reverse sequence to that at the time of insertion. Specifically, when an instruction to feed out the optical disk is inputted to the optical disk drive 1, the motor 5 rotates in the reverse direction to that at the time of insertion. As a result, the slider 6 slides rearward. As shown in FIG. 17, the slider 6 has a second pressing portion 6d located forwardly of the first pressing portion 6c. In the process in which the first pressing portion 6c is pushing the pressed portion 35c of the ring operating lever 35 forward, the pressed portion 35c is fitted into a gap between the first pressing portion 6c and the second pressing portion 6d. When the slider 6 is moved rearward, therefore, the pressed portion 35c of the ring operating lever 35 is pushed rearward, and the operating ring 34 is moved from the second ring position toward the first ring position. As a result, fixation of the optical disk D1 by the chuck pulley 33 is released. In the process in which the operating ring 34 is moved from the second ring position toward the first ring position, the rear arm 41 is pulled upward toward the first position prior to the front arm 42 as mentioned above. When the slider 6 slides rearward, the rollers 21R and 21L return into the carrying positions, and feeding-out (discharge) of the optical disk D1 by the rollers 21R and 21L is started.

Figure 18B:
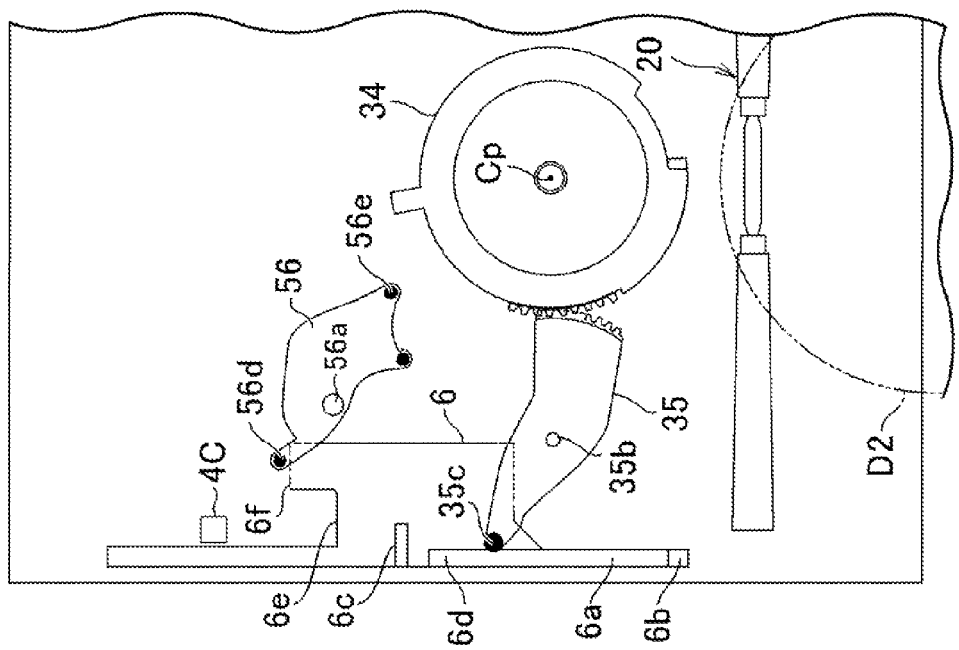
FIGS. 18A and 18B are views showing motions of the centering mechanism, the carrying mechanism and the chucking mechanism.
Figure 18A:
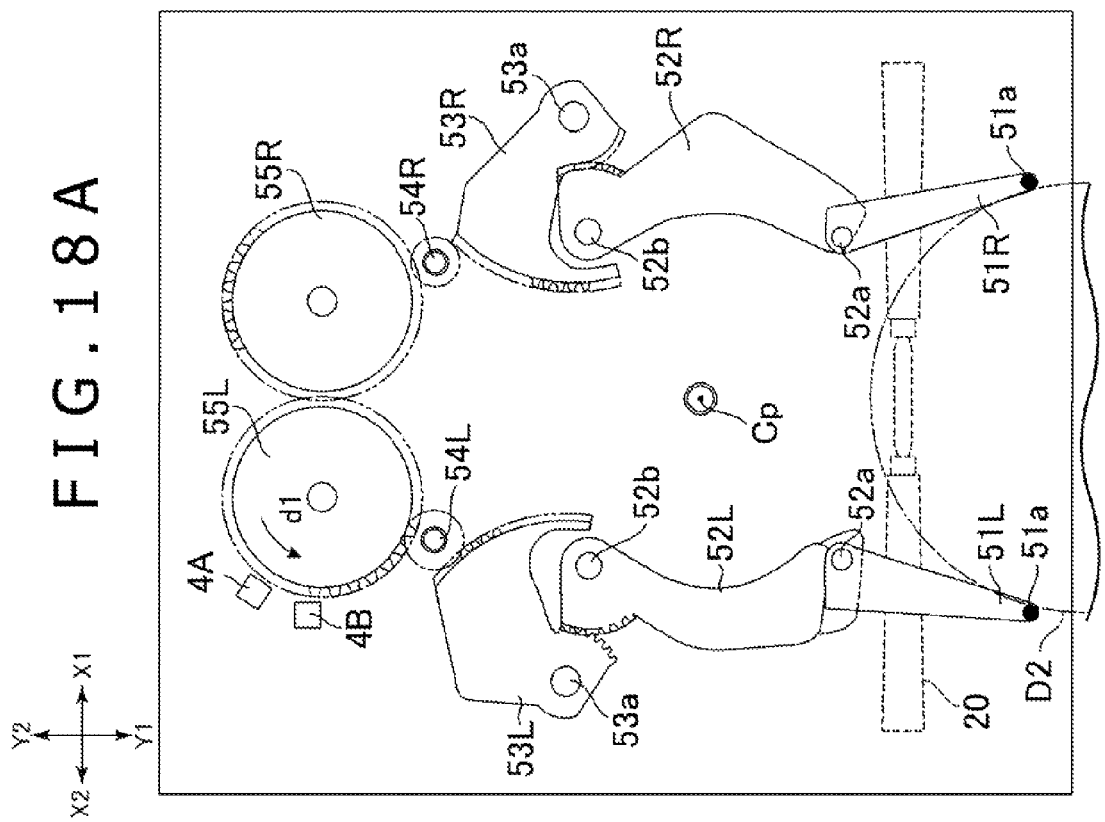

Now, operations (motions) upon insertion of an optical disk D2 with a diameter of 8 cm will be described. Also upon insertion of the optical disk D2, as shown in FIG. 18A, the projections 51a of the detection arms 51L and 51R are contacted by an edge of the optical disk D2, so that the detection arms 51L and 51R are opened in leftward and rightward directions. Consequently, the arms 52L, 53L, 52R, and 53R are rotated with the shaft portions 52b and 53a as centers, and the second gear 55L on the left side is rotated counterclockwise (see arrow dl). When the second gear 55L is rotated by a predetermined angle, the first sensor 4A is turned from an OFF state into an ON state. This triggers the motor 5 to start rotating. In response to this, rotation of the carrying roller 20 is started, and the optical disk D2 is carried by the carrying roller 20.

The slider 6 is provided at its rear portion with a second pressed portion 6f, in addition to the above-mentioned first pressed portion 6e. When the optical disk D2 with a diameter of 8 cm is inserted, the rotation amount of the second arm 53R to which the shaft portion 56a of the slider pressing lever 56 is attached is smaller, as compared with that when the optical disk D1 with a diameter of 12 cm is inserted. Therefore, while the pressing portion 56*d* of the slider pressing lever 56 is located rearwardly of the first pressed portion 6*e* as shown in FIG. 16B at the time of insertion of the optical disk D1 with a diameter of 12 cm, the pressing portion 56*d* of the slider pressing lever 56 is located rearwardly of the second pressed portion 6*f* as shown in FIG. 18B at the time of insertion of the optical disk D2 with a diameter of 8 cm.

As shown in FIG. 19A, the slider pressing lever 56 is formed with a positioning portion 56*e* which projects downward through a hole formed in the top frame 12. The optical disk D2 is carried until it comes into contact with a total of four positioning portions 52*d*, 52*d*, 53*d*, and 56*e* possessed by the arms 52R, 52L, and 53R and the slider pressing lever 56, and it is positioned in the drive position by the positioning portions 52*d*, 52*d*, 53*d*, and 56*e*. In this instance, carrying of the optical disk D2 is finished, and the optical disk D2 is stopped in the drive position. As above-mentioned, when the optical disk D2 with a diameter of 8 cm is inserted, the rotation amount of the second gear 55L is smaller, as compared with that when the optical disk D1 with a diameter of 12 cm is inserted. When the optical disk D2 with a diameter of 8 cm is inserted, therefore, the second sensor 4B remains in an OFF state.

As shown in FIG. 19B, when the slider pressing lever 56 is rotated about the shaft portion 56*a* because the positioning portion 56*e* of the slider pressing lever 56 is pressed by the optical disk D2, the pressing portion 56*d* pushes the second pressed portion 6*f* of the slider 6 forward. In the state shown in FIG. 19B, namely, in the state wherein the slider 6 is in contact with the slider pressing lever 56, the first pressing portion 6*c* of the slider 6 is spaced rearward from the pressed portion 35*c* of the ring operating lever 35. At this stage, therefore, rotation of the operating ring 34 has not yet been started.

Figure 20:
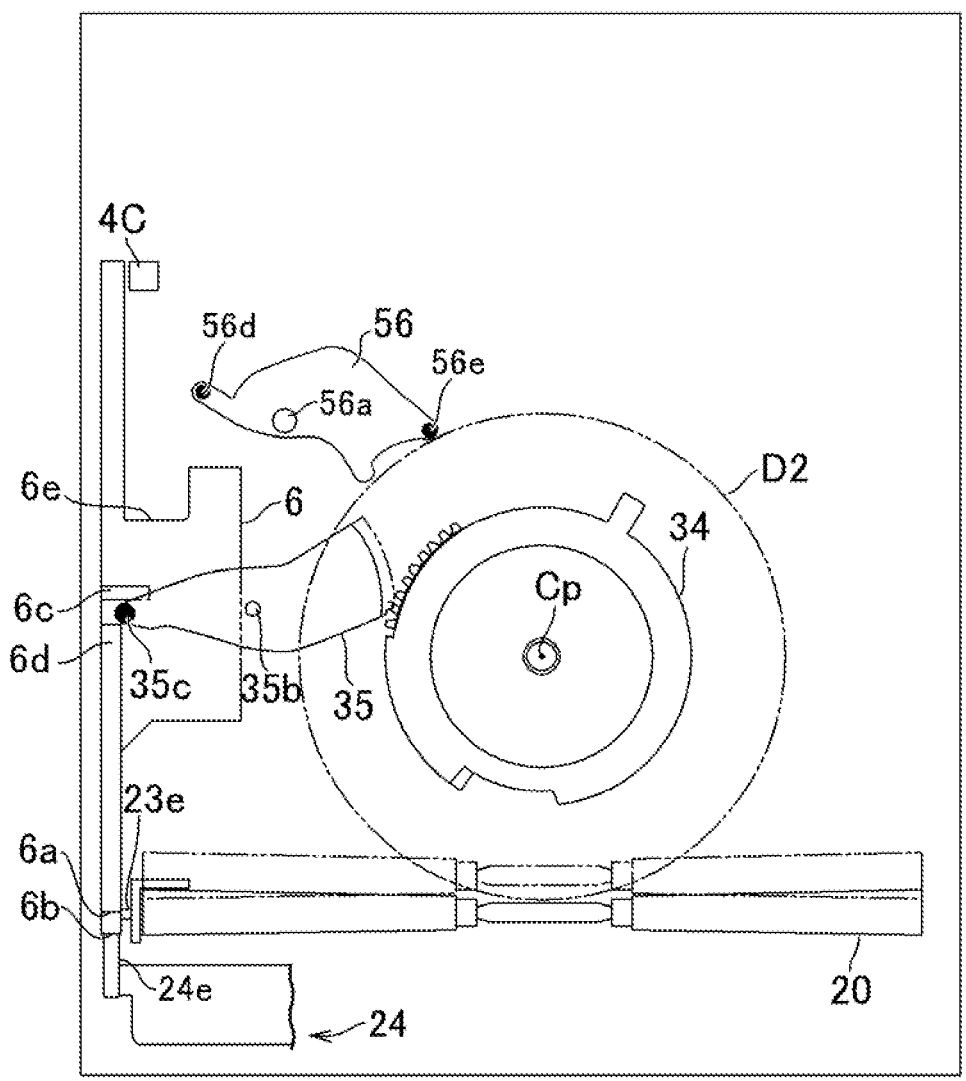
FIG. 20 is a view showing motions of the centering mechanism, the carrying mechanism and the chucking mechanism.

When the slider 6 is moved forward by being pressed by the slider pressing lever 56, the rack of the slider 6 and the gear 7*c* mesh with each other. This causes the slider 6 to start moving forward under power of the motor 5. As a result, as shown in FIG. 20, the slider 6 moves further forward, and the roller operating portions 6*a* and 6*b* push the pressed portions 23*e* and 24*e* of the roller brackets 23 and 24 forward. This results in that the rollers 21R and 21L are disposed in the retracted positions as shown in FIG. 5B, and that the shutter portion 24*g* of the right roller bracket 24 closes the insertion port a as shown in FIG. 6B.

In addition, as shown in FIG. 20, the first pressing portion 6*c* of the slider 6 pushes the pressed portion 35*c* of the ring operating lever 35 forward. As a result, the operating ring 34 rotates from the first ring position toward the second ring position, and the chuck pulley 33 is lowered toward the second pulley position. The third sensor 4C is turned into an ON state when the movement of the slider 6 is completed, namely, when the slider 6 has completely pushed down the pressed portions 23*e* and 24*e* of the roller brackets 23 and 24. This triggers stopping of the driving of the motor 5. The foregoing is the operations (motions) of the mechanisms at the time of insertion of the optical disk D2.

When an instruction to feed out the optical disk D2 is inputted to the optical disk drive 1, the motor 5 rotates in the reverse direction to that at the time of insertion. As a result, the slider 6 slides rearward. When the slider 6 moves rearward, as shown in FIG. 20, the pressed portion 35*c* of the ring operating lever 35 is pushed rearward by the second pressing portion 6*d* of the slider 6, and the operating ring 34 is moved from the second ring position toward the first ring position. Consequently, the chuck pulley 33 is pulled upward from the second pulley position toward the first pulley position. Besides, when the slider 6 slides rearward, the rollers 21R and 21L return into the carrying positions, and feeding-out (discharge) of the optical disk D2 by the rollers 21R and 21L is started.

As has been described above, the optical disk drive 1 includes the turntable 2, the chuck pulley 33, and the pulley operating mechanism (41, 42, 34, 35). The turntable 2 is for rotating the optical disk mounted thereon. The chuck pulley 33 is movable in the direction of the axis of the turntable 2, between the first pulley position spaced from the turntable 2 and the second pulley position close to the turntable 2 for gripping the optical disk, and the chuck pulley 33 is being attracted toward the turntable 2 by a magnetic force. The pulley operating mechanism (41, 42, 34, 35) moves the chuck pulley 33 between the first pulley position and the second pulley position. At the time of moving the chuck pulley 33 between the first pulley position and the second pulley position, the pulley operating mechanism inclines the chuck pulley 33 in relation to the turntable 2, and brings the chuck pulley 33 closer to or away from the turntable 2. Specifically, the pulley operating mechanism includes the rear arm 41 and the front arm 42 which support an outer peripheral portion of the chuck pulley 33 and which are located at positions spaced from each other along the circumferential direction of the chuck pulley 33. Besides, at the time of moving the chuck pulley 33 between the first pulley position and the second pulley position, the pulley operating mechanism moves one of the rear arm 41 and the front arm 42 prior to the other. According to the optical disk drive 1 configured as above, generation of sound at the time of attraction of the chuck pulley 33 onto the turntable 2 by the magnetic force can be suppressed. In addition, the force required for separating the chuck pulley 33 from the turntable 2 can be reduced.

Besides, the optical disk drive 1 includes the carrying roller 20 which is disposed so as to make contact with the surface of the optical disk and which carries the optical disk in the front-rear direction. The carrying roller 20 includes the left roller 21L and the right roller 21R which are aligned in the left-right direction and which are so disposed as to individually make contact with the surface of the optical disk. The axis CL of the left roller 21L is so inclined that the distance between the axis CL and the surface of the optical disk gradually increases from a left end portion toward a central portion of the carrying roller 20. Similarly, the axis CR of the right roller 21R is so inclined that the distance between the axis CR and the surface of the optical disk gradually increases from a right end portion toward a central portion of the carrying roller 20. This ensures that the width in the left-right direction of the areas of contact between the rollers 21L and 21R and the optical disk can be reduced.

The present disclosure is not restricted to the optical disk drive 1 described hereinabove, and various modifications may be made.

For instance, the right roller 21R and the left roller 21L may not necessarily be able to move vertically in an independent manner. In this case, the carrying mechanism A may have only one roller bracket.

The shaft portions 23*a* and 23*b* of the left roller bracket 23 and the shaft portions 24*a* and 24*b* of the right roller bracket 24 may be disposed coaxially with each other.

The right roller 21R and the left roller 21L may be so supported that they can move in parallel in the vertical direction.

The rollers 21R and 21L may be produced by other method than the two-color molding (double molding).

The left roller bracket 23 and the right roller bracket 24 may not necessarily be pressed by a common movable member (specifically, the slider 6). In other words, one slider for the left roller bracket 23 and another slider for the right roller bracket 24 may be provided.

The arms 41 and 42 constituting the chucking mechanism C may not necessarily be moved by the operating ring 34. For example, the chucking mechanism C may be separately provided with a member for moving the rear arm 41 and with a member for moving the front arm 42.

In addition, the optical disk drive 1 may be provided with a member for pressing the ring operating lever 35, separately from the member (specifically, the slider 6) for pressing the roller brackets 23 and 24 of the carrying mechanism A.

The number of the arms for moving the chuck pulley 33 may not limited to two. For instance, the optical disk drive 1 may be provided with three arms or four arms.

The present application contains subject matter related to that disclosed in Japanese Priority Patent Application JP 2013-148887 filed in the Japan Patent Office on Jul. 17, 2013, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk drive comprising:
   a base frame;
   a turntable coupled to the base frame, the turntable being configured to receive and rotate an optical disk about an axis;
   a chuck pulley having a central axis and being configured to be movable relative to the base frame and the turntable, between a first pulley position spaced from the turntable and a second pulley position which is close to the turntable and in which the chuck pulley grips the optical disk together with the turntable, the chuck pulley being attracted toward the turntable by a magnetic force; and
   a pulley operating mechanism configured to move the chuck pulley between the first pulley position and the second pulley position, wherein the pulley operating mechanism, at the time of moving the chuck pulley between the first pulley position and the second pulley position, moves the chuck pulley from the first pulley position in which the central axis is parallel to the axis of the turntable, to an intermediate position in which the central axis is inclined in relation to the axis of the turntable, and to the second pulley position in which the central axis is again parallel to the axis of the turntable.

2. The optical disk drive according to claim 1, wherein
   the pulley operating mechanism includes a first arm and a second arm which support an outer peripheral portion of the chuck pulley, the first arm and second arm spaced from each other along a circumferential direction of the chuck pulley, and
   the pulley operating mechanism, at the time of moving the chuck pulley between the first pulley position and the second pulley position, moves one of the first arm and the second arm prior to the other.

3. The optical disk drive according to claim 2, wherein
   the chuck pulley is disposed in the first pulley position when each of the first arm and the second arm is disposed in a first position,
   the chuck pulley is disposed in the second pulley position when each of the first arm and the second arm is disposed in a second position, and
   the first arm and the second arm are moved between the first positions and the second positions by a common movable member.

4. The optical disk drive according to claim 2, wherein the first arm and the second arm are so formed that a leverage of the first arm is greater than a leverage of the second arm.

5. The optical disk drive according to claim 4, wherein the pulley operating mechanism moves the first arm prior to the second arm at the time of moving the chuck pulley from the second pulley position to the first pulley position.

6. The optical disk drive according to claim 4, wherein
   each of the first arm and the second arm is movable in the direction of the axis of the turntable with a fulcrum portion as a center, and includes a support portion configured to support the outer peripheral portion of the chuck pulley, and
   the distance from the fulcrum portion to the support portion of the first arm and the distance from the fulcrum portion to the support portion of the second arm are different from each other.

7. The optical disk drive according to claim 2, wherein
   each of the first arm and the second arm includes a support portion configured to support the outer peripheral portion of the chuck pulley, and
   the distance from the center of the chuck pulley to the support portion of the first arm is greater than the distance from the center of the chuck pulley to the support portion of the second arm.

8. An optical disk drive comprising:
   a turntable on which an optical disk is mounted and which rotates the optical disk;
   a chuck pulley configured to be movable in the direction of an axis of the turntable between a first pulley position spaced from the turntable and a second pulley position which is close to the turntable and in which the chuck pulley grips the optical disk together with the turntable, the chuck pulley being attracted toward the turntable by a magnetic force; and
   a pulley operating mechanism configured to move the chuck pulley between the first pulley position and the second pulley position, such that the chuck pulley is inclined in relation to the turntable as the chuck pulley is brought closer to or further away from the turntable, wherein:
   the pulley operating mechanism includes a first arm and a second arm which support an outer peripheral portion of the chuck pulley, the first arm and second arm spaced from each other along a circumferential direction of the chuck pulley, and
   the pulley operating mechanism, at the time of moving the chuck pulley between the first pulley position and the second pulley position, moves one of the first arm and the second arm prior to the other.

* * * * *